United States Patent [19]

Deutsch et al.

[11] 4,079,650

[45] Mar. 21, 1978

[54] ADSR ENVELOPE GENERATOR

[75] Inventors: Ralph Deutsch; Leslie J. Deutsch, both of Sherman Oaks, Calif.

[73] Assignee: Deutsch Research Laboratories, Ltd., Los Angeles, Calif.

[21] Appl. No.: 652,217

[22] Filed: Jan. 26, 1976

[51] Int. Cl.[2] ........................................ G01H 1/02

[52] U.S. Cl. ........................................ 84/1.26; 84/1.01; 84/1.03; 84/1.13; 84/1.17; 84/1.24

[58] Field of Search ........................ 84/1.01, 1.03, 1.11, 84/1.13, 1.17, 1.19, 1.24, 1.25, 1.26

[56] References Cited

U.S. PATENT DOCUMENTS

| | | | |
|---|---|---|---|
| 3,610,799 | 10/1971 | Watson | 84/1.26 |
| 3,610,805 | 10/1971 | Watson et al. | 84/1.26 |
| 3,952,623 | 4/1976 | Deutsch | 84/1.26 |

*Primary Examiner*—E. S. Jackmon

*Attorney, Agent, or Firm*—Ralph Deutsch

[57] ABSTRACT

A single amplitude curve generator is time shared amongst a plurality of musical tone generators for controlling their musical shapes. The curve generator creates a wide variety of envelope characteristics by implementing a recursive computation algorithm for selected choices of a single curve shape parameter coupled with the use of a collection of timing clocks used to vary the time intervals associated with the attack, decay, and release regions of the musical tone envelope. Provision is made for forcing the release of a tone generator when a limited number of tone generators have been completely assigned in a keyboard musical instrument and a new note key switch is actuated. Note release signals can be ignored until the amplitude curve generator has completed the attack and decay regions for a given tone generator.

30 Claims, 24 Drawing Figures

FIG. 2
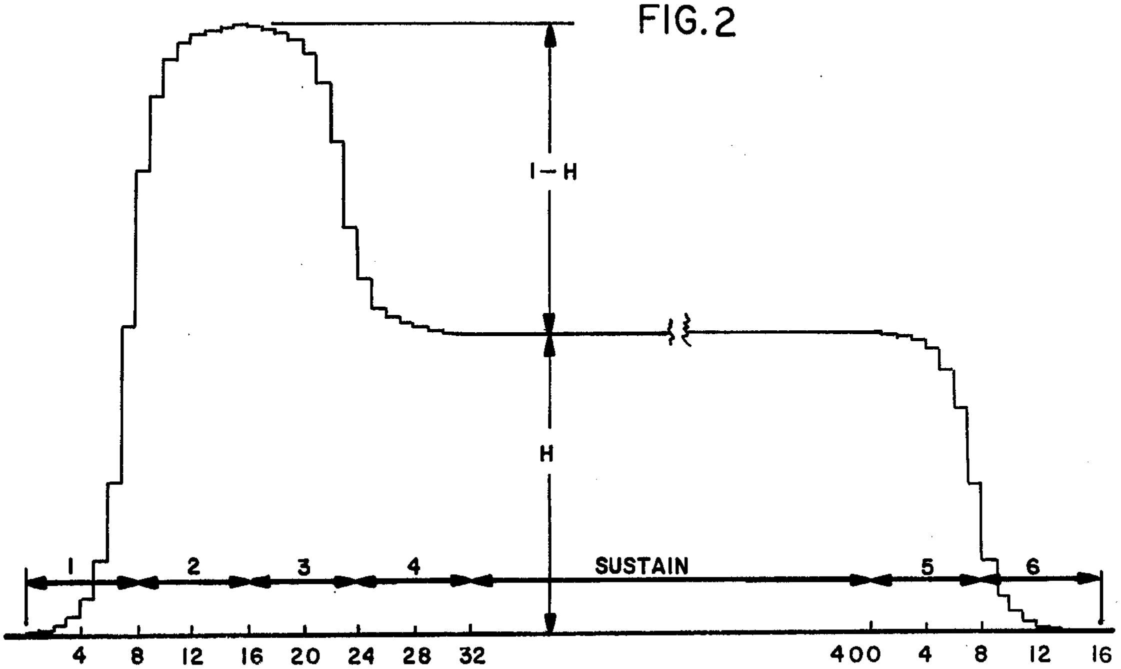
FIG. 3a
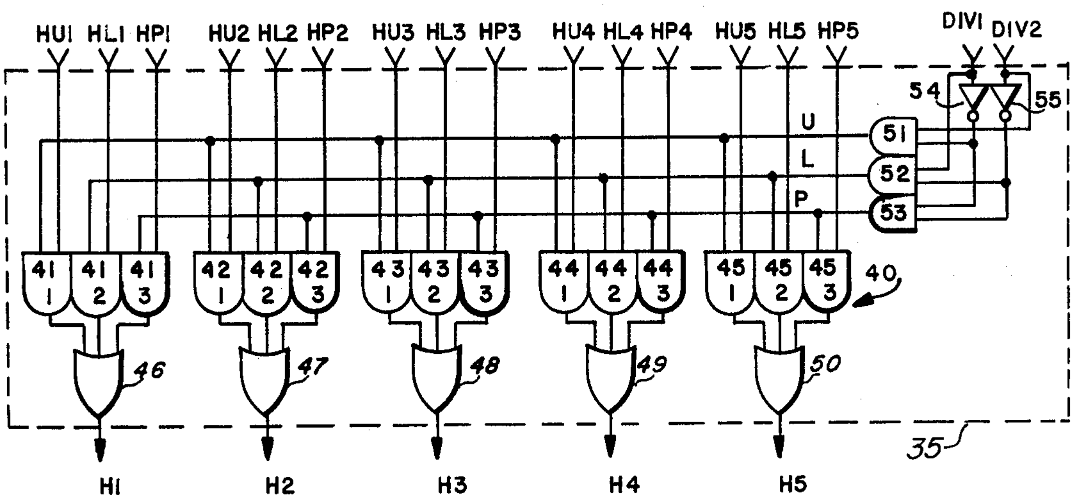
FIG. 3b
| DIV1 | DIV2 | |
|---|---|---|
| 0 | 0 | P |
| 1 | 0 | L |
| 0 | 1 | U |

FIG.4a
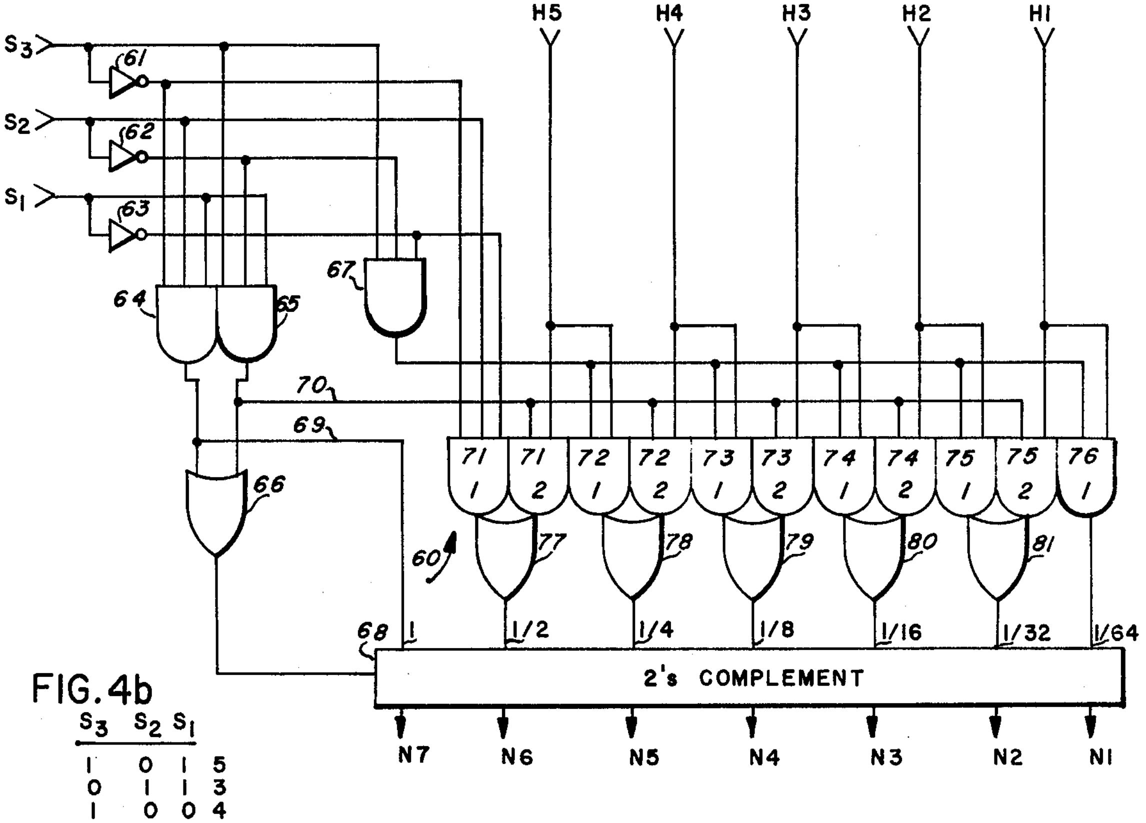
FIG.4b
| $S_3$ | $S_2$ | $S_1$ | |
|---|---|---|---|
| 1 | 0 | 1 | 5 |
| 0 | 1 | 1 | 3 |
| 1 | 0 | 0 | 4 |
FIG.5
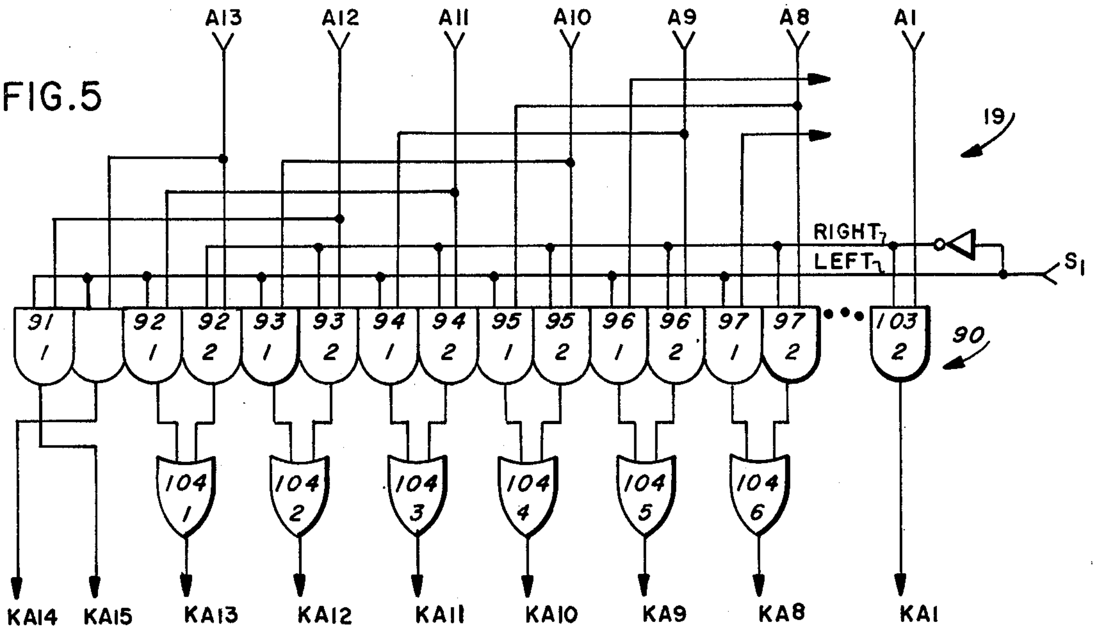

FIG. 6a
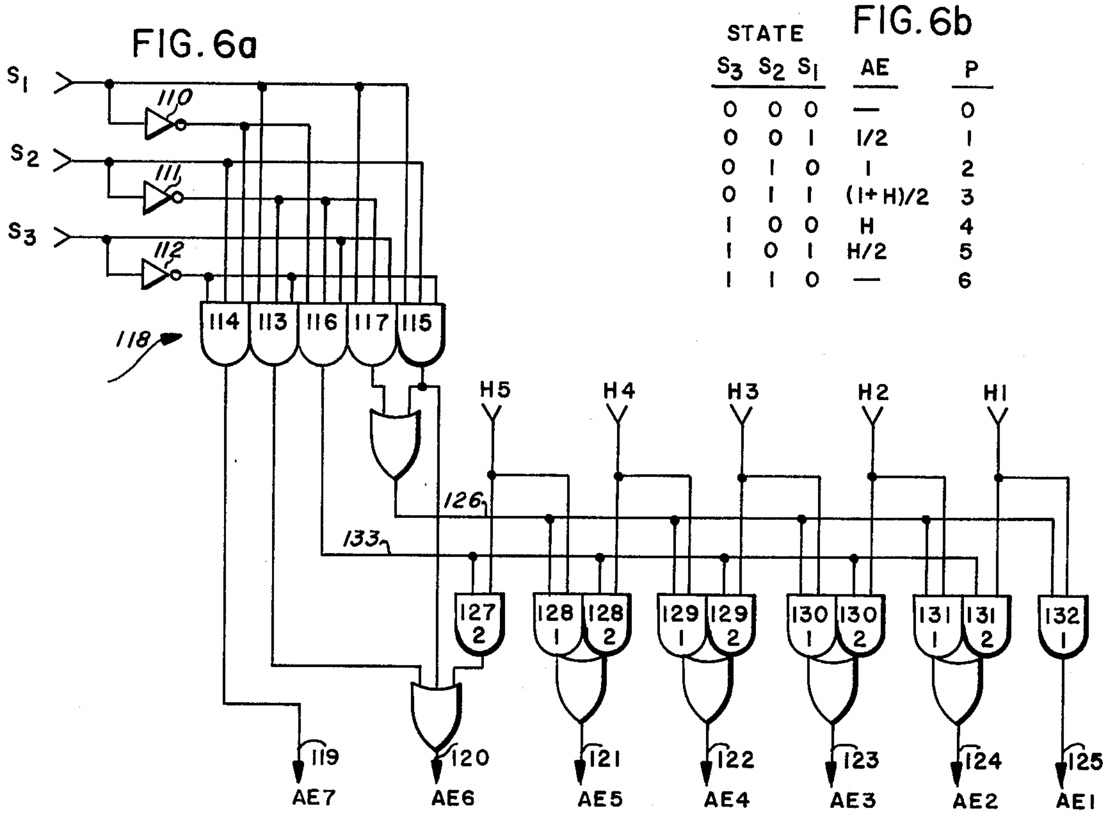
FIG. 6b
| STATE $S_3$ | $S_2$ | $S_1$ | AE | P |
|---|---|---|---|---|
| 0 | 0 | 0 | — | 0 |
| 0 | 0 | 1 | 1/2 | 1 |
| 0 | 1 | 0 | 1 | 2 |
| 0 | 1 | 1 | (1+H)/2 | 3 |
| 1 | 0 | 0 | H | 4 |
| 1 | 0 | 1 | H/2 | 5 |
| 1 | 1 | 0 | — | 6 |
FIG. 7
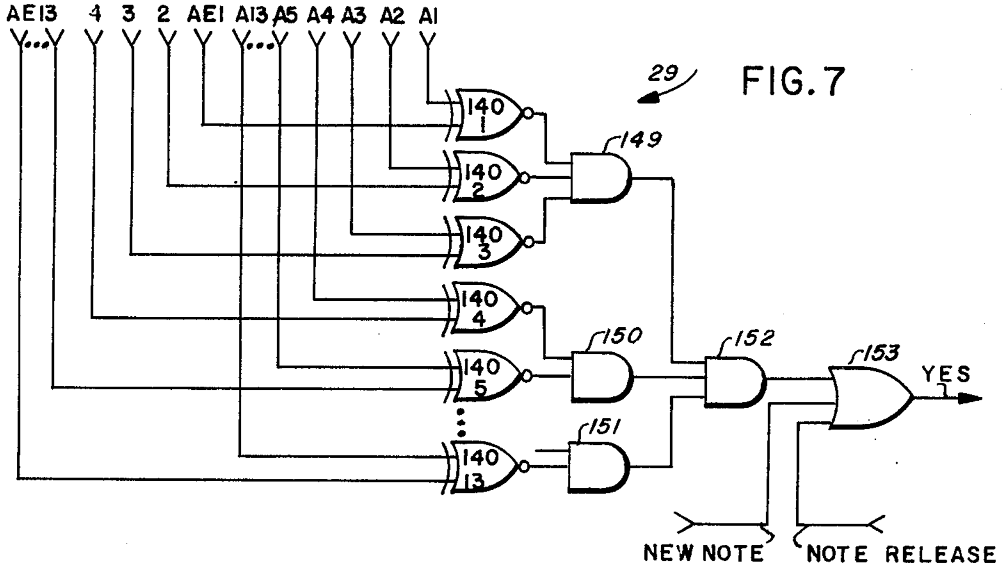

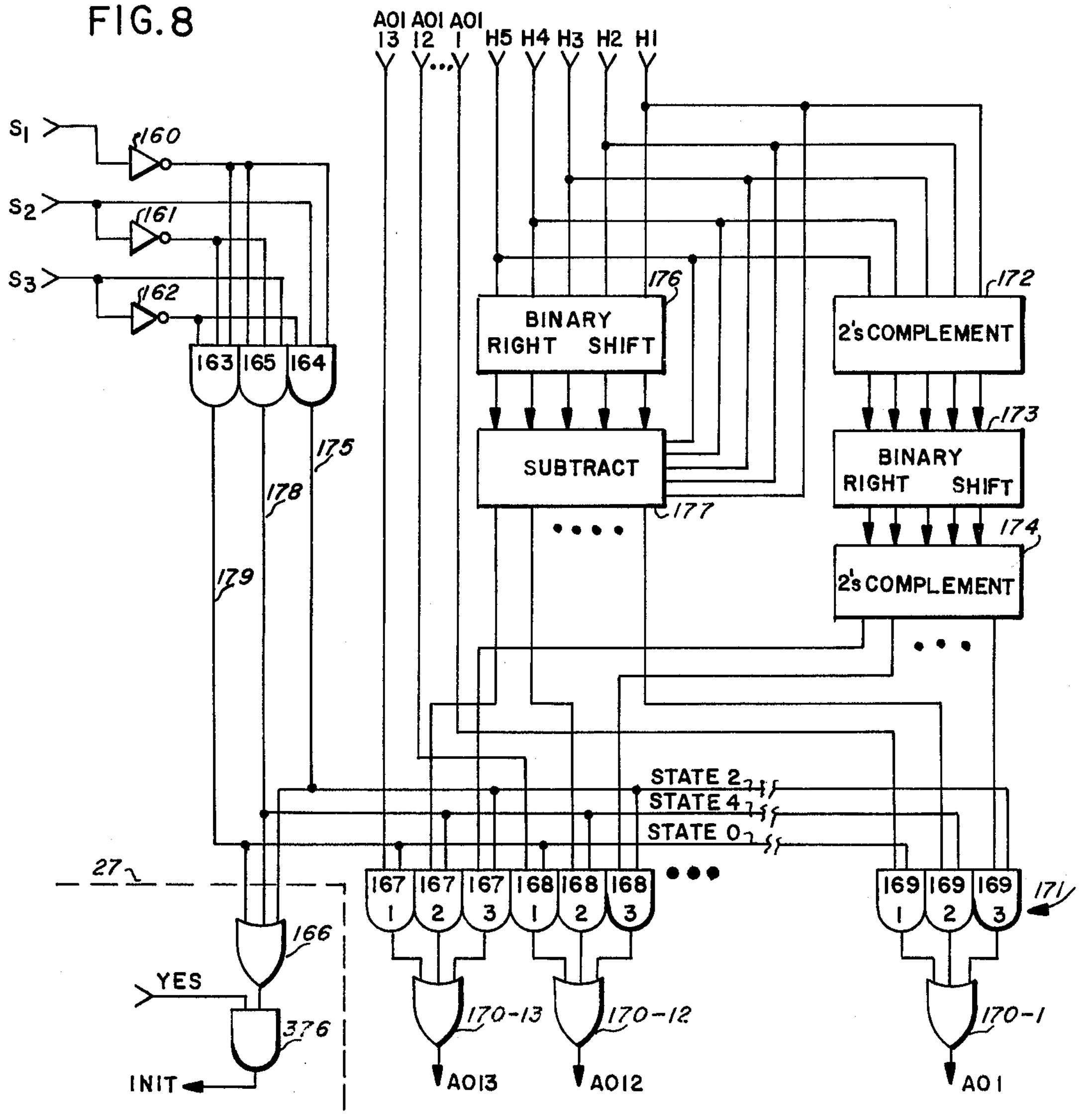
FIG. 8
FIG. 11
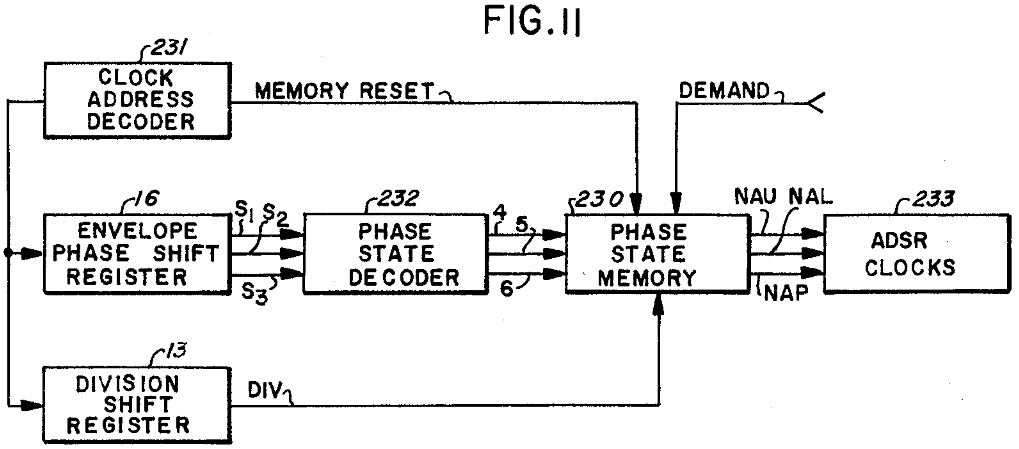

ADSR ENVELOPE GENERATOR

BACKGROUND OF THE INVENTION

Field of the Invention

The present invention relates to the production of waveshape envelopes in a polyphonic musical instrument.

Related Applications

This invention is related to the inventors copending U.S. patent applications Ser. No. 603,776 filed on Aug. 11, 1975 entitled POLYPHONIC TONE SYNTHESIZER, and Ser. No. 619,615 filed on Oct. 6, 1975 entitled KEYBOARD SWITCH DETECT AND ASSIGNOR.

Description of the Prior Art

It is well established that in addition to the harmonic structure of a musical waveshape, it is the envelope of the waveshape that must be controlled to provide an essential constituent of musical tonality. Various envelope shapes are used and their selection is dependent upon the type of music that is played on the musical instrument. Fast or light popular music is frequently played with an abrupt start for the attack and an abrupt stop for the release of the note. For an electronic organ intended to be imitative of a pipe organ it is desirable to simulate the attack and release of the tone by gradually increasing the tone envelope at the leading edge and gradually decreasing the envelope at the trailing end. For a tone synthesizer designed to be imitative of acoustical musical instruments, following the gradually increasing attack there is usually a gradually decreasing decay to about one half the peak value. The half amplitude is maintained while the corresponding key is actuated. When the key is deactuated the tone envelope is released by gradually decreasing to zero value. In analog type tone generators, resistance capacitance networks are commonly used to generate envelope waveforms.

Watson et al., in U.S. Pat. No. 3,610,805 disclose an attack and decay system for a digital electronic organ in which the duration of the attack or delay is controlled by a counter which may be selectively enabled to count timed pulses having a rate independent of the note frequency, or to count cycles or half cycles of the specific note frequency. In essence, the counter serves to determine the abscissa in a graph of amplitude versus time for the attack or decay. The ordinate or amplitude scale of the graph is provided by a plurality of amplitude scale factors stored in a fixed memory accessed by the counter. The scale factors are read from the fixed memory as required and supplied to a multiplier which receives as a second input the digital samples being read from the tone generator memory of a digital electronic organ, the multiplier forming the product of these two inputs to scale the leading and trailing portions of the note waveform. In the preferred embodiment, the count is initiated when the attack mode is entered. Unless the attack system is disabled, a positive attack is provided in which the counter is forced to complete the attack regardless of whether or not the key remains depressed.

It is frequently desirable in an electronic musical instrument to employ a "sustain" feature by which a keyed note is selectively caused to have a relatively long release time. The purpose of the "sustain" provision is to cause the note sound to die away gradually after the key is released. Usually only one instrument division, such as the upper keyboard, is operated in the "sustain" mode at any given time. Because in many tone generators of the digital type, only a limited number of tone generators is available, a problem arises when "sustain" is used if the musician should key several notes very quickly in succession by running a finger or fingers down the keyboard, to produce a glissando effect. In such an event the available tone generators are very quickly fully assigned, and any further keying will yield void, i.e., no sound when a key is depressed.

Deutsch, in U.S. Pat. No. 3,610,806 discloses an adaptive sustain feature for a digital tone generator to provide automatic variation of the duration of decay, when the "sustain" mode is used in those situations where all of the tone generators are presently assigned. As soon as all tone generators have been assigned, the system automatically enters the adaptive sustain mode in which any tone generator assigned to a note associated with a key on the division having "sustain" effect, and which generator is supplying the waveform that has had the longest duration of release, is switched immediately from a long release (i.e. the normal "sustain") to a relatively shorter release (which may be the normal release in the absence of the use of "sustain"). This action expedites the availability of a tone generator for assignment of a tone generator for the next note request.

The use of a fixed memory to provide scale factors for envelope control is limited because of the large memories required to satisfy the exacting envelope control required by tone synthesizers.

SUMMARY OF THE INVENTION

The subject invention generates an amplitude function to be utilized by a tone generator to control the envelope shape of musical waveshapes. The generator functions on a recurrence principle wherein for each step of a phase of the amplitude function a new point is generated from the previous point. The amplitude function is divided into state phases which, as shown in FIG. 2, designate portions of the attack, decay, and release regions of the amplitude function. The recurrence algorithm is changed for different state phases. Read/write memories are used for storing amplitudes and phase state information in such a manner that a single amplitude function generator can be shared to generate envelope functions for a plurality of musical tone generators.

A collection of adjustable frequency timing clocks is used such that independent timing is available for each state phase. The recurrence algorithm used contains a single parameter H which measures the height of the sustain region of the envelope. (The sustain region follows the decay region and is sometimes confused by the term "sustain" which denotes the effect wherein a slow decay timing clock is used.) The value of H in cooperation with the adjustable timing clocks can produce a wide variety of envelopes as illustrated in FIG. 17. Normally the changes in the envelope function are sigmoidal in shape. If very fast time clocks are used and $H=1$, then the very abrupt shape of FIG. 17*a* results. FIG. 17*b* is the normal organ attack for $H=1$ and slower timing clocks. FIG. 17*c* corresponds to $H=\frac{1}{2}$ and shows the typical envelope overshoot curve used in tone synthesizers. FIG. 17*d* is obtained with $H=0$ and is the well-known piano curve. A very fast attack is used and the decay has two speeds. The second phase of the decay is timed at a slower speed than that of the first phase.

An alternative implementation means is described wherein for a preselected set of values of H, the recurrence algorithm is readily implemented by binary shifting in conjunction with control logic.

The division of the amplitude into phase state regions permits a simplified means for implementing positive attack.

It is an object of the present invention to provide an amplitude function generator for utilization by a musical system wherein the steps of the function are obtained by recursive operations on previous steps and wherein a single controllable parameter value can vary the amplitude function through a variety of shapes.

It is a second object to provide an automatic release mode whereby in those instances in which all available tone generators have been assigned, the actuation of an additional keyboard switch automatically causes the rapid release of one of the tone generators. The choice of the released tone generator is decided by preselected phase state priority.

BRIEF DESCRIPTION OF THE DRAWINGS

A detailed description of the invention will be made with reference to the accompanying drawings, wherein like numerals designate like components in the several figures.

FIG. 2 illustrates the phase state regions of the amplitude function.

FIG. 3*a* is a logic diagram of scale select system block.

FIG. 3*b* is the coding table for instrument division data.

FIG. 4*a* is a logic diagram of the N compute block.

FIG. 4*b* is the coding table used to decode phase state numbers.

FIG. 5 is a logic diagram of the binary shift system block.

FIG. 6*a* is a logic diagram of the phase end amplitude predictor.

FIG. 6*b* is a table of end-amplitudes for each phase state.

FIG. 7 is a logic diagram of the comparator block.

FIG. 8 is a logic diagram of the envelope phase initializer.

FIG. 11 is an electrical block diagram for forced note release system.

DESCRIPTION OF THE PREFERRED EMBODIMENT

The following detailed description is of the best presently contemplated modes of carrying out the invention. This description is not to be taken in a limiting sense, but is made merely for the purpose of illustrating general principles of the invention since the scope of the invention is best defined by the appended claims. Structural and operational characteristics attributed to forms of the invention first described shall also be attributed to forms later described, unless such characteristics are obviously inapplicable or unless specific exception is made.

Figure 1:
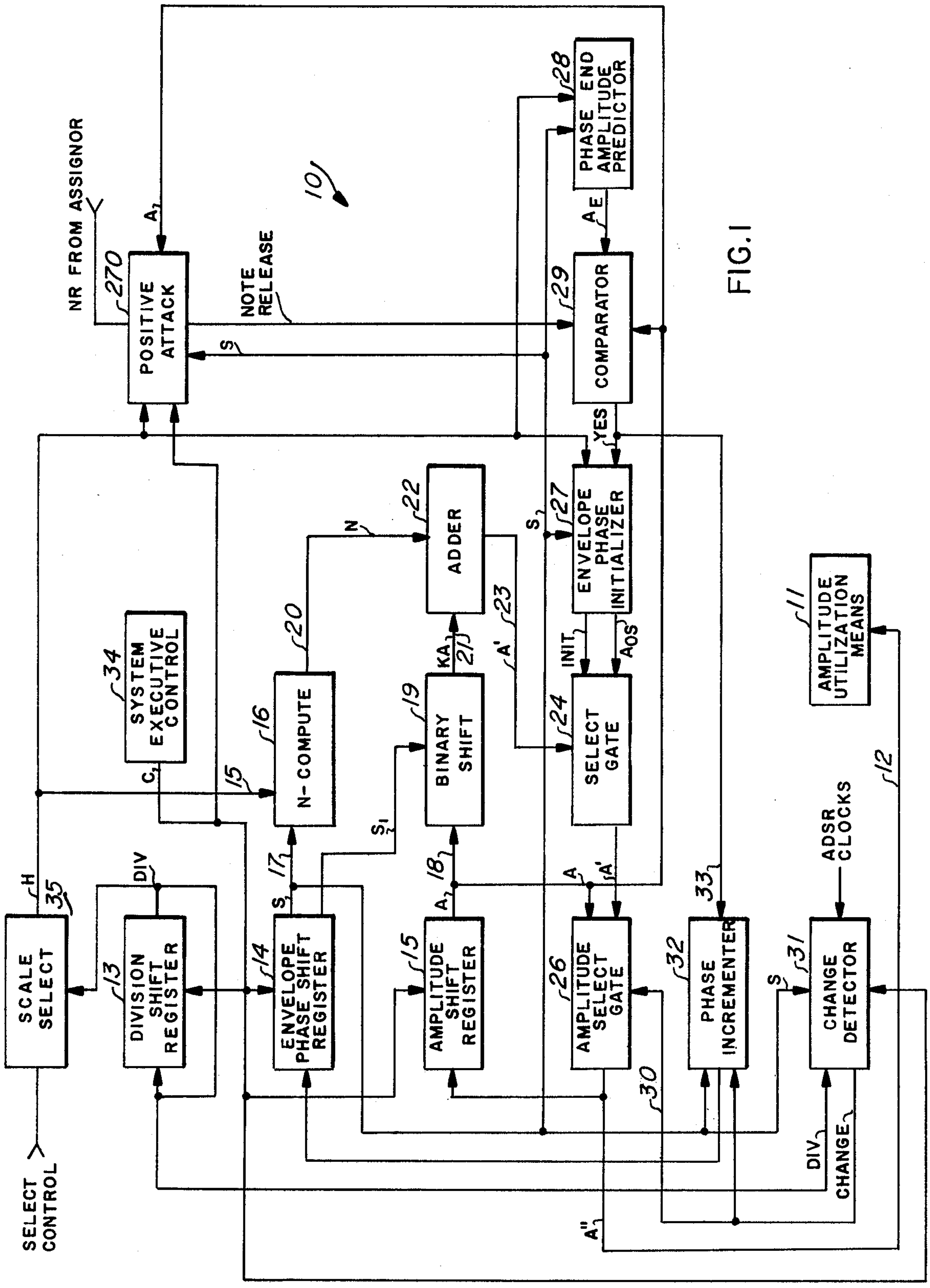
FIG. 1 is an electrical block diagram of an ADSR envelope generator.

The ADSR Envelope Generator 10 of FIG. 1 operates to produce an amplitude versus time function for use in polyphonic electronic musical instruments via amplitude utilization means 11. FIG. 2 illustrates a typical amplitude versus time function supplied to amplitude utilization means via line 12. The amplitude function shown in FIG. 2 is commonly divided into four regions which are comprised of 7 amplitude phase states. Amplitude phase states 1 and 2 comprise the attack region of the amplitude function. Amplitude phase states 3 and 4 comprise the decay region of the amplitude function. Amplitude phase states 5 and 6 comprise the release region of the amplitude function. The region of the amplitude function extending from the end of amplitude phase state 4 to the beginning of amplitude phase state 5 comprises the sustain region of the amplitude function. Phase state zero corresponds to an unassigned tone generator. The amplitude function is commonly referred to as the envelope function particularly in those subsystems of musical instruments where the amplitude function has been used to modulate the amplitude of a musical waveshape.

As described below the attack, decay, and release regions are generated by implementing a computational algorithm appropriate to the constituent phases of each region. The circuitry of system 10 shown in FIG. 1 operates by evaluating numbers by the following relations.

| | | |
|---|---|---|
| phase 1: | $A' = 2A$ | (Equation 1) |
| phase 2: | $A' = A/2 + 1/2$ | (Equation 2) |
| phase 3: | $A' = 2A - 1$ | (Equation 3) |
| phase 4: | $A' = A/2 + H/2$ | (Equation 4) |
| phase 5: | $A' = 2A - H$ | (Equation 5) |
| phase 6: | $A' = A/2$ | (Equation 6) |

where $A$ is the previous amplitude and $A'$ is the new value. There are a wide variety of computational algorithms which can be implemented for an ADSR envelope generator. The preceding relations are advantageous because the implementing system does not require any memory which indicates which particular step on the amplitude function is to be calculated. All that is required is the knowledge of which phase of the curve is current and the immediate preceding value of the amplitude.

While the number of steps in each phase is a system design parameter it is advantageous to divide the phases into a number that is a power of two. In system 10 each phase consists of $2^{k-1}$ steps for $k=4$. Phase 1 is started with an initial value of $A_{01}=2^{-B}/2$ where $B=2^{k-1}-1$. For $k=4$, the initial value $A_{01}=1/256$.

Table 1 lists the initial amplitudes that are selected by system 10 at the start of phases 1,3 and 5.

TABLE 1

| Phase | Initial Value |
|---|---|
| 1 | $A_{01} = 2^{-B}/2$ |
| 3 | $A_{03} = 1 - A_{01}(1\text{-}H)$ |
| 5 | $A_{05} = H(1\text{-}A_{01})$ |

H, as shown in FIG. 2, is the amplitude of the sustain region of the amplitude function. H is an input parameter chosen by the musician to effectively change the shape of the amplitude function.

Division shift register 13, shown in FIG. 1 is an end-around shift register containing words of 2 bits in length which denote the organ division of a particular note that is currently being played on the musical instrument. Generally, electronic organs consist of an upper, lower and pedal division. These divisions are also called swell, great and pedal when the organ is designed for concert and church use. Envelope phase shift register 14 is a shift register containing words of 3 bits in length which denote the amplitude function phase status of each of the currently played notes. Amplitude shift register 15 is a shift register containing words of 13 bits in length which are the current amplitude values for each of the notes being played.

Each of the preceding shift registers contain the same number of words, this number being equal to the polyphonic capability of the musical instrument. It has been found that the number 12 is a good choice and corresponds to the number of fingers plus the two feet of a player. The three shift registers can be combined into a single shift register having words of 18 bits in length. Alternatively the shift registers can be replaced by read/write memories.

Division shift register 13, envelope shift register 14, and amplitude shift register 15 are all addressed in synchronism such that the data corresponding to each note is read out simultaneously.

The DIV signal read from division shift register 13 is used by scale select 35 to select a value of H corresponding to the division assigned to the current note whose amplitude function is to be evaluated. In system 10 of FIG. 1, each division is assigned its own scale value of H. FIG. 3*a* shows the logic comprising the system block scale select 35 and is described below.

System 10 evaluates the relations given by Equation (1) through Equation (6) in the generalized form $$A' = KA + N \qquad \text{(Equation 7)}$$

where $A$ is the preceding amplitude number, $A'$ is the new amplitude number, and $K$ and $N$ are shown in Table 2.

TABLE 2

| Phase | Phase State Number $S_3S_2S_1$ | K | N |
|---|---|---|---|
| 0 | 0 0 0 | (Note is not being played) | |
| 1 | 0 0 1 | 2 | 0 |
| 2 | 0 1 0 | 1/2 | 1/2 |
| 3 | 0 1 1 | 2 | -1 |
| 4 | 1 0 0 | 1/2 | H/2 |
| 5 | 1 0 1 | 2 | -H |
| 6 | 1 1 0 | 1/2 | 0 |

N-compute 16 receives the selected value of H via line 15 and the phase state $S=S_1S_2S_3$ via line 17. From these values N-compute 16 determines the corresponding value of N shown in Table 2. FIG. 4*a* shows the logic comprising system block N-compute 16 and is described below.

Binary shift 19 receives the amplitude value A via line 18 read out from amplitude shift register 15 and evaluates KA corresponding to Equation (7). Table 2 indicates that KA is either a right or a left shift of the binary data representing the amplitude A. Moreover, a right shift corresponds to the LSB of $S$, $S_1=0$ and a left shift corresponds to $S_1=1$. Therefore, binary shift 19 is a conventional binary data shift which is shown in FIG. 5 and described below.

Adder 22 receives the value of N Via line 20 and the value KA via line 21 and outputs the sum $A'=KA+N$ on line 23 to select gate 24. If there has occurred no transition between phase states of the amplitude function, select gate 24 transfers the value $A'$ inputed on line 23 to amplitude select gate 26 via line 25. If a transition has occurred between phase states, then select gate 24 transfers the initial phase state amplitude $A_{os}$ received from envelope phase initializer 27 to line 25.

Phase end amplitude predictor 28 receives the current phase state value S and amplitude shape constant H and predicts the value $A_E$ that corresponds to the amplitude for the end of the given phase state. The predicted value $A_E$ is sent to comparator 29. FIG. 6 shows the logic comprising phase end amplitude predictor 28 and is described below.

Comparator 29 receives the current amplitude value $A$ read out from amplitude shift register 15 and compares A with the value $A_E$ created by phase end amplitude predictor 28. If the values of A and $A_E$ are equal then a "YES" signal is generated. FIG. 7 shows the logic comprising comparator 29 and is described below.

Envelope phase initializer 27 receives the current phase state number S and if a "YES" signal is received from comparator 29 causes the transfer of an initial value $A_{os}$ for the phase that is just being initiated for a particular amplitude curve. The values of $A_{os}$ are selected as shown in Table 1. FIG. 8 shows the logic comprising envelope phase initializer 27 and is described below.

Amplitude select gate 26 determines whether the new amplitude value $A'$ is to be selected or if the current amplitude value A is to be retained. The selected value is stored in amplitude shift register 15 and is made available to amplitude utilization means 11. The selection of $A$ or $A'$ is controlled by the "CHANGE" signal received on line 30 from change detector 31.

Change detector 31 receives timing clock signals from ADSR clocks which time the generation of each phase of an amplitude function for a selected division of the musical instrument. Edge detectors are employed to determine if a timing clock transition has occurred. If such a transition is detected a "CHANGE" signal is generated and transmitted to amplitude select gate 26. FIG. 9 shows the logic comprising change detector 31 and is described below.

Figure 10:
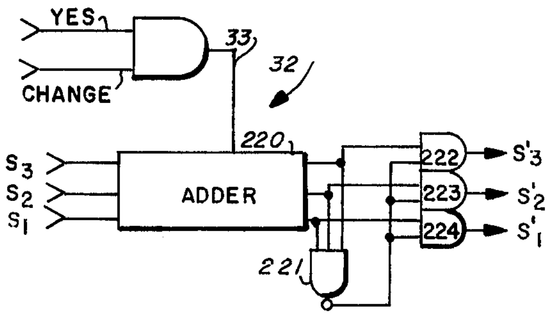
FIG. 10 is a logic diagram of the phase incrementer.
Figure 17:
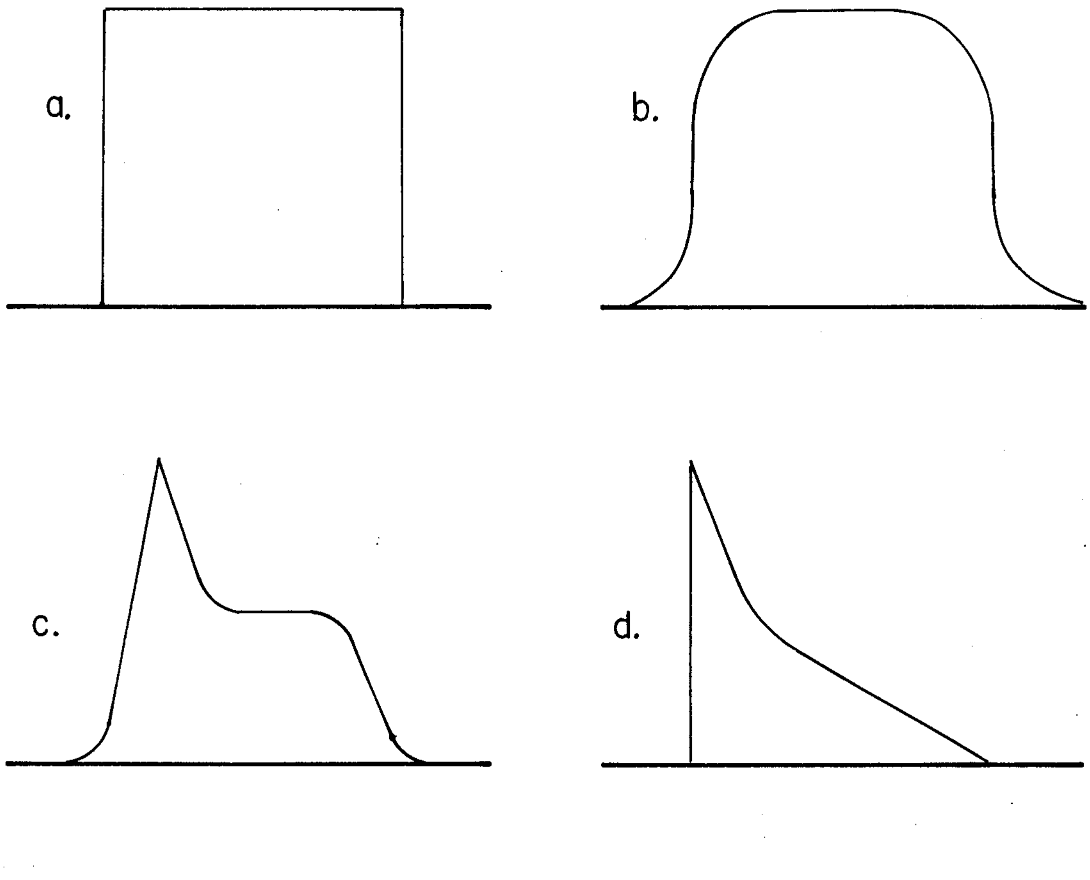
FIGS. 17*a* through 17*d* illustrate typical ADSR envelopes.

Phase incrementer 32 receives the current value of the phase state S read out from envelope phase shift register 14 and CHANGE signal. If the "YES" signal is received from comparator 29 via line 33 and the CHANGE signal is received from change detector 31, then S is incremented. If the "YES" signal is not present the phase state S is not incremented. The original value of $S$ or $S+1$ is transferred to be stored in envelope phase shift register 14. FIG. 10 shows the logic comprising phase incrementer 32 and is described below.

System executive control 34 generates the timing and control signals utilized by the other subsystem logic blocks. A time slot is created for each of the notes in the polyphonic tone generator for which amplitude functions are generated.

Table 3 lists the amplitude A generated at each step of each phase state of the amplitude function. The amplitude entries are evaluated from the relations previously listed in Equation (1) through Equation (6) combined with the initial values given in Table 1. H is selected as $H=\frac{1}{2}$ and $A_{01}=1/256$. The amplitude is also shown in binary form for an amplitude word consisting of 13 bits. In practice, phase 4 continues until phase 5 is called when a note on the musical instrument's keyboard has been detected to have been released. The continuance of phase 4 keeps the amplitude at a constant value because the finite bit accuracy of the amplitude words simply ignores any further small changes after step 32 as illustrated in Table 3.

found to provide adequate resolution in the amplitude function when used in conjunction with musical instruments of the tone synthesizer variety.

FIG. 4*a* shows the logic comprising N-compute 16. The purpose of this circuitry is to compute the entries listed in Table 2 under the heading N. AND gate 64 in conjunction with invertors 61, 62, 63 decodes phase state 3 as shown in the truth table of FIG. 4*b*. Thus a "1" signal is created by AND gate 64 when the phase state 3 is read out from envelope phase shift register 14. Similarly AND gate 65 decodes phase state 5 and creates a signal when phase state 5 is read out. The signals from AND gate 64 and AND gate 65 are combined in OR gate 66. The output of OR gate 66 will be a "1" whenever either a phase state 3 or 5 is read. This signal is sent to 2's complement 68 which complements the input signals in response to a "1" signal from OR gate 66.

If S denotes phase state 1, no signals will appear on any of the input signal lines to 2's complement 68. The output value is $N=0$; or $N_7=N_6=N_5=N_4=N_3=N_2=N_1=0$. $N_7$ represents the numerical value 1; that is, the decimal point is implicit between $N_7$ and $N_6$.

TABLE 3

| Phase | Step | Amplitude | Binary Amp. | Phase | Step | Amplitude | Binary Amp. |
|---|---|---|---|---|---|---|---|
| 1 | 1 | 1/256 | 0000000010000 | 4 | 25 | 350/512 | 1010000000000 |
| 1 | 2 | 1/128 | 0000001000000 | 4 | 26 | 288/512 | 1001000000000 |
| 1 | 3 | 1/64 | 0000010000000 | 4 | 27 | 272/512 | 1000100000000 |
| 1 | 4 | 1/32 | 0000100000000 | 4 | 28 | 264/512 | 1000010000000 |
| 1 | 5 | 1/16 | 0001000000000 | 4 | 29 | 260/512 | 1000001000000 |
| 1 | 6 | 1/8 | 0010000000000 | 4 | 30 | 258/512 | 1000000100000 |
| 1 | 7 | 1/4 | 0100000000000 | 4 | 31 | 257/512 | 1000000010000 |
| 1 | 8 | 1/2 | 1000000000000 | 4 | 32 | 256.5/512 | 1000000001000 |
| 2 | 9 | 3/4 | 1100000000000 | | | ........ | |
| 2 | 10 | 7/8 | 1110000000000 | 5 | 401 | 255/512 | 0111111110000 |
| 2 | 11 | 15/16 | 1111000000000 | 5 | 402 | 254/512 | 0111111100000 |
| 2 | 12 | 31/32 | 1111100000000 | 5 | 403 | 252/512 | 0111111000000 |
| 2 | 13 | 63/64 | 1111110000000 | 5 | 404 | 248/512 | 0111110000000 |
| 2 | 14 | 127/128 | 1111111000000 | 5 | 405 | 240/512 | 0111100000000 |
| 2 | 15 | 255/256 | 1111111100000 | 5 | 406 | 224/512 | 0111000000000 |
| 2 | 16 | 511/512 | 1111111110000 | 5 | 407 | 192/512 | 0110000000000 |
| 3 | 17 | 511/512 | 1111111110000 | 5 | 408 | 128/512 | 0100000000000 |
| 3 | 18 | 510/512 | 1111111100000 | 6 | 409 | 1/8 | 0010000000000 |
| 3 | 19 | 508/512 | 1111111000000 | 6 | 410 | 1/16 | 0001000000000 |
| 3 | 20 | 504/512 | 1111110000000 | 6 | 411 | 1/32 | 0000100000000 |
| 3 | 21 | 496/512 | 1111100000000 | 6 | 412 | 1/64 | 0000010000000 |
| 3 | 22 | 480/512 | 1111000000000 | 6 | 413 | 1/128 | 0000001000000 |
| 3 | 23 | 448/512 | 1110000000000 | 6 | 414 | 1/256 | 0000000100000 |
| 3 | 24 | 384/512 | 1100000000000 | 6 | 415 | 1/512 | 0000000010000 |
| | | | | 6 | 416 | 1/1024 | 0000000001000 |

FIG. 3*a* shows the logic comprising scale select 14. The DIV signal read out from division shift register 13 consists of the binary bits DV1 and DV2. These bits are decoded to provide the instrument's division signals U, L, and P by means of invertors 54 and 55 and the AND gates 51, 52, and 53. The decoding is shown in the truth table of FIG. 3*b*. The upper division's amplitude function value H, or HU is entered on lines HU5, HU4, HU3, HU2, HU1. Similarly the value of H for the lower division is entered on lines HL5, HL4, HL3, HL2, HL1 and the value of H for the pedal division is entered on lines HP5, HP4, HP3, HP2, HP1.

In all cases wherein the description refers to the individual bits of a binary word, the bit designated by "1" is the LSB (least significant bit).

Gates 40 serve to select HU, HL, or HP in accordance with the gating signals U, L, P decoded from the DIV signal. AND gates 41-1, 42-1, 43-1, 44-1, 45-1 transmit HU to the output when $U=1$. AND gates 41-2, 42-2, 43-2, 44-2, 45-2 transmit HL to the output when $L=1$. AND gates 41-3, 42-3, 43-3, 44-3, 45-3 transmit HP to the output when $P=1$.

The curve shape values HU, HL, and HP are selectable by the musician. Advantageously a set of selector switches is used to insert the desired values. Alternatively a table of values of H is used and a selection from this table is made for each of the instrument's divisions. Representing the value of H by five binary bits has been When S denotes phase state 2, AND gate 71-1 decodes this state and a signal $N_6'=1$ is created and sent to 2's complement 68. This signal is not complemented so that the output is $N=\frac{1}{2}$ because $N_6$ corresponds to the value $\frac{1}{2}$.

When S denotes phase state 3, AND gate 64 creates a "1" signal on line 69. Since the same signal causes the 2's complement 68 to complement input values, the net result is that the 2's complement representation of $N=-1$ appears on the output signal lines.

AND gate 67 decodes phase state 4 and causes AND gates 72-1, 73-1, 74-1, 75-1, and 76-1 to produce a binary right shift of the H data $H_5$, $H_4$, $H_3$, $H_2$, $H_1$ appearing on the input lines. For phase state 4, the data collected by OR gates 77 through 81 and from 76-1 is not complemented so that $N=H/2$ is output.

When S denotes phase state 5, AND gates 71-2, 72-2, 73-2, 74-2, 75-2 and OR gates 77 through 81 cause the data $H_5$, $H_4$, $H_3$, $H_2$, $H_1$ to be passed to 2's complement 68 which performs the 2's complement of the data to output the value $N=-H$.

When S is in state 6, no output data is produced corresponding to $N=0$. FIG. 5 shows the logic comprising binary shift 19. If $S_1$ is a "1" signal then AND gates 91-1 through 102-1 cause the input amplitude data $A_{13}$ through $A_1$ to be left shifted by one bit position to cause the amplitude data to be doubled. If $S_1$ is a "0" signal then AND gates 92-2 through 103-2 cause the input amplitude data to be right shifted by one bit position to cause the amplitude data to be halved. OR gates 104-1 through 104-11 serve to combine the data from each corresponding pair of AND gates.

FIG. 6*a* shows the logic comprising phase end amplitude predictor 28. Invertors 110, 111, 112 in conjunction with AND gates 118 decode the binary phase state signal $S=S_3S_2S_1$ to the individual decimal phase states 1,2,3,4,5;

FIG. 6*b* shows a table of the phase states and the value of the amplitude $A_E$ that corresponds to the last amplitude in that state. It is the purpose of the circuitry in amplitude predictor 28 to generate values of $A_E$ that are used to test if the current amplitude value has reached the end of an amplitude phase.

AND gate 113 decodes phase state 1 and causes a "1" signal to appear on line 120. The decimal point is between AE7 and AE6. Therefore a "1" on line 120 corresponds to $AE=\frac{1}{2}$ as listed in FIG. 6*b*. AND gate 114 decodes phase state 2 and causes a "1" signal to appear on line 119 so that AE7 is a "1". This corresponds to $AE=1$.

AND gate 115 decodes phase state 3 and causes a "1" signal to appear on line 120 corresponding to a value of $\frac{1}{2}$. At the same time a "1" signal appears on line 126 causing AND gates 128-1 through 132-1 to cause a right shift of $H=H_5,H_4, H_3,H_2,H_1$ to appear on lines 121 through 125. The net result is the desired value of $A_E=(1+H)/2$.

AND gate 116 decodes phase state 4 and causes a "1" to appear on line 133 when phase state 4 is read out from envelope phase shift register 14. A "1" signal on line 133 causes AND gates 127-2 through 131-2 to transfer $H_5,H_4,H_3,H_2,H_1$ unchanged to lines 121 through 125. The new result is the amplitude $A_E=H$. AND gate 117 decodes phase state 5 and causes a "1" to appear on line 126 when phase state 5 is read out from envelope phase shift register 14. A "1" signal on line 133, as described previously, causes a binary right shift of one bit of $H_5,H_4,H_3,H_2,H_1$. The net result is the amplitude $A_E=H/2$.

FIG. 7 shows the logic comprising comparator 29 which generates a "YES" signal when the current amplitude A is equal to $A_E$. The comparator comprises EX-NOR gates 140-1 through 140-13 each of which creates a "1" signal if the corresponding bits of A and $A_E$ are identical. The tree of AND gates 149, 150, 151, and 152 cause a "1" at OR gate 153 if the bits comprising A and $A_E$ are identical. A "YES" signal is generated if A is identical to $A_E$, or a NEW NOTE signal is present, or a note release signal is present as furnished by a note release detect system such as that described in the inventors' copending U.S. patent application Ser. No. 619,615 filed on Oct. 6, 1975 entitled KEYBOARD SWITCH DETECT AND ASSIGNOR. The NEW NOTE signal is also furnished by a note release detect signal.

FIG. 8 shows the logic comprising envelope phase initializer 27. The principle functions of this circuitry is to generate the initial values $A_o$ for certain phases as listed in Table 1 and to create "INIT" signal when an initial value $A_o$ is to be substituted by select gate 24 for the current calculated Value A'.

FIG. 8 provides 13 lines for the binary number $A_{01}$. These can be eliminated for the illustrative case in which $A_{01}$ was chosen to be a fixed number, $A_{01}=1/256$, but the circuitry is shown for the more general case of other selected values of $A_{01}$.

Invertors 160, 161, and 162 in conjunction with AND gates 163, 164, and 165 decode the binary states of the input phase state signal S to individual decimal states. AND gate 163 decodes phase state 0 and causes a "1" signal to appear on line 179 when a zero phase state is read out from envelope phase shift register 14. A "1" signal on line 179 causes the bits $A_{013}$, $A_{012}$ . . . $A_{01}$ to be transferred via AND gates 167-1 through 169-1 to output lines 170-1 through 170-13. Only three of the thirteen sets of AND gates comprising logic 171 are explicitly drawn in FIG. 8.

The amplitude shape factor $H=H_5,H_4, H_3, H_2, H_1$ is transformed to the value 1-H by 2's complement 172. Since $A_0$ was selected as 1/256, the value $A_0(1\text{-}H)$ is obtained by binary right shift 173 causing a binary right shift of 8 bit positions. 2's complement 174 produces the value $1-A_0(1-H)$ at its output terminals.

AND gate 164 decodes phase state 2 when it is present and creates a "1" signal on line 175. A "1" signal on 175 causes AND gates 167-3 through 169-3 to transfer the output signal from 2's complement 174 to the output signal lines 170-1 through 170-13 so that the value $1-A_0(1-H)$ is the output of the subsystem.

Binary right shift 176, right shifts $H_5,H_4,H_3,H_2,H_1$ by 8 bit positions to cause the value $HA_0$ to appear at the input to subtract 177. The second input to subtract 177 is H. Thus the output signal is the value $H(1-a_0)$.

AND gate 165 decodes phase state 4 when it is present and creates a "1" signal on line 178. A "1" signal on line 178 causes AND gates 167-2 through 169-2 to transfer the signal $H(1-A_0)$ from subtract 177 to the output signal lines 170-1 through 170-13.

OR gate 166 in conjunction with AND gate 376 causes an "INIT" signal to be created if an input phase state is in either states 0, 4, or 2 and if a "YES" signal has been generated by comparator 29.

Figure 9A:
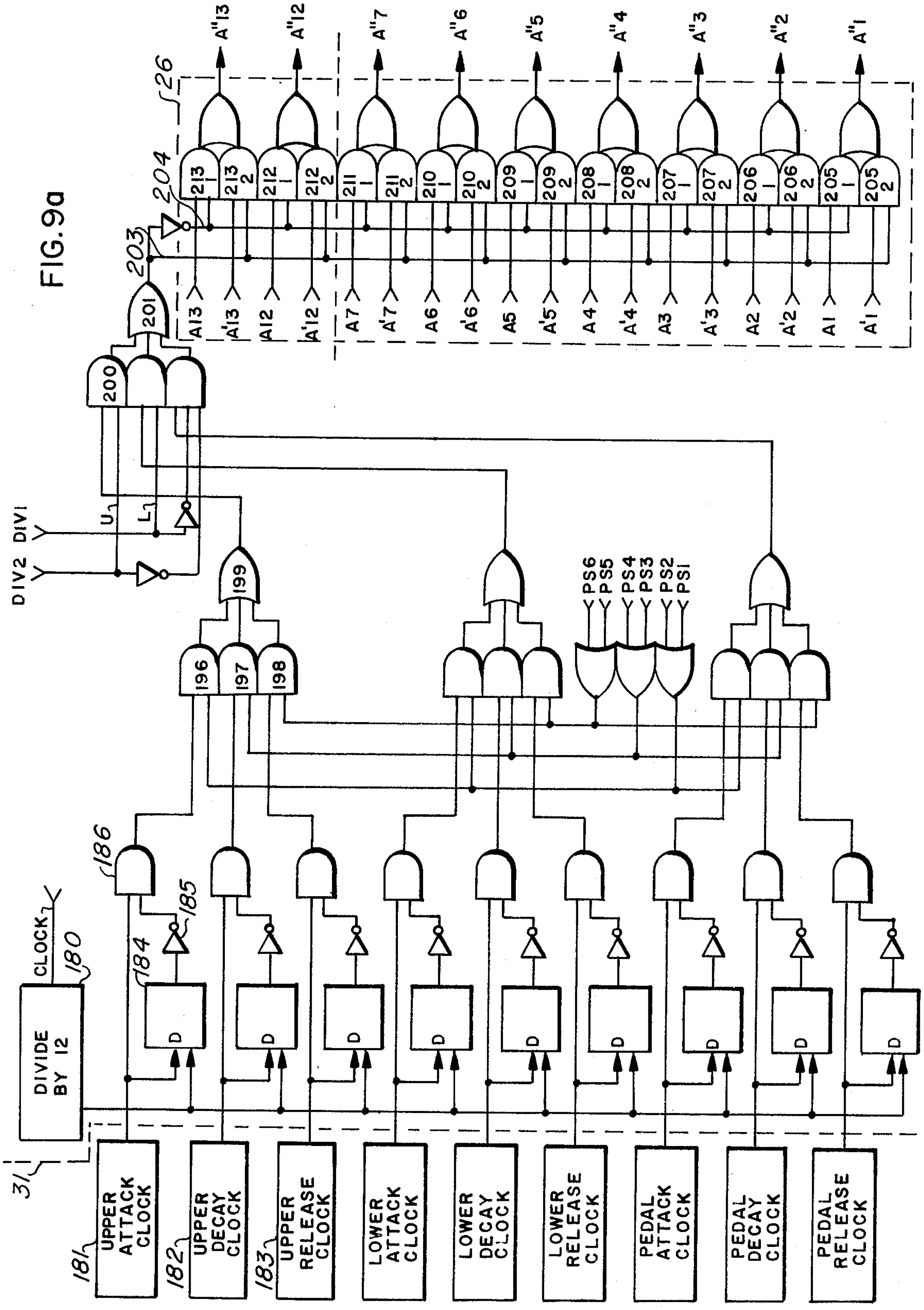
FIG. 9*a* is a logic diagram of the change detector.

FIG. 9*a* shows the logic comprising change detector 31. The attack, decay, and release segments of an amplitude function are timed independently of each other by means of three independent clock signals. Upper attack clock 181 controls the speed of the upper division attack during state phases 1 and 2. Upper decay clock 182 controls the speed of the upper division decay during state phases 3 and 4. Upper release clock 183 controls the speed of the upper division release during state phases 5 and 6. Similar sets of clocks are used for the lower and pedal divisions.

Flip-flop 184 in combination with invertor 185 and AND gate 186 constitute an edge detector. Flip-flop 184 is clocked at the start of each new read out cycle of the amplitude shift register 15 shown in FIG. 1. Divide by 12 180 divides the shift register clock timing signals by 12. There are 12 words residing in the shift registers. The output signal from AND gate 186 will be a "1" if an upper attack clock signal is received by the edge detector and there was no signal on the previous read out scan of the amplitude shift register 15. Similar edge detectors are used in conjunction with all the other envelope clock timing signals.

Figure 9B:
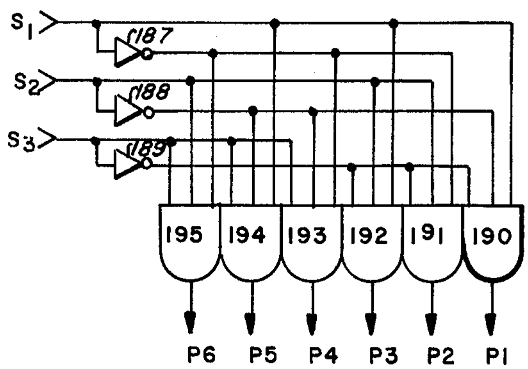
FIG. 9*b* is a logic diagram of a binary to decimal phase state convertor.

FIG. 9*b* shows the phase state binary to decimal decoding logic consisting of invertors 187, 188, 189, and AND gates 190 through 195. The output of each AND gate will be a "1" when states 1 through 6 are read out from envelope phase shift register 14.

AND gate 196 will cause a "1" signal to be transferred to AND gate 200 via OR gate 199 if an upper attack clock signal has occurred since the prior shift register scan and if either phase state 1 or 2 has been read out from envelope phase shift register 14.

AND gate 197 will cause a "1" signal to be transferred to AND gate 200 if an upper decay clock signal has occurred since the prior shift register scan and if either phase state 3 or 4 has been read out.

AND gate 198 will cause a "1" signal to be transferred to AND gate 200 if an upper release clock signal has occurred since the prior shift register scan and if either phase state 5 or 6 has been read out.

OR gate 201 will cause a "1" signal to appear on line 203 if the DIV signal is decoded to correspond to U, upper division, and if any upper division timing clocks has had a state transition when any of the states 1 through 6 has been read out. When a "1" appears on line 203, AND gates 205-2 through 213-2 cause the data bits $A_1'$ through $A_{13}'$ to appear as the output bits $A_1''$ through $A_{13}''$. When a "0" is transferred by OR gate 201, invertor 202 causes a "1" to appear on line 204. A "1" on line 204 causes AND gates 205-1 through 213-1 to transfer data bits $A_1$ through $A_{13}$ to appear on the output bits $A_1''$ through $A_{13}''$.

AND gates 205-1 through 213-1 and 205-2 through 213-2 comprise the logic of amplitude select gate 26.

Similar logic as that described above is used for the lower and pedal divisions.

FIG. 10 shows the logic comprising phase incrementer 32. Adder 220 adds the "YES" signal to the binary number $S_3S_2S_1$ representing the current phase state read out from envelope phase shift register 14 if the CHANGE signal has been generated by change detector 31. NAND gate 221 creates a "0" signal if adder 220 produces state 7 consisting of $S_3'=S_2'=S_1'=1$. If a "0" is created by NAND gate 221, AND gates 222, 223, and 224 generate "0" signals so that the undesired state 7 is converted to state 0 which corresponds to an unassigned note in the shift registers shown in FIG. 1.

Almost any keyboard musical instrument in which the plurality of tone generators is less than the number of keyboard switches encounters the undesirable situation in which all tone generators have been assigned and a new key is actuated. The situation of such a "no sound" condition is aggravated when one, or more divisions of the instrument is using a slow release to create the musical effect commonly called "sustain." (This term should not be confused with the same word used in the present invention to label a nominal flat portion of the envelope amplitude function.)

System logic block 230 shown in FIG. 11 is a means for eliminating the otherwise annoying zero sound conditions that can occur in tone generators of the type described in the inventors' copending U.S. patent application Ser. No. 603,776 filed on Aug. 11, 1975 entitled POLYPHONIC TONE SYNTHESIZER. As each phase state is read out from envelope phase shift register 14 it is decoded and phase states 6, 5, and 4 are stored in phase state memory 230 along with the associate division state number. When all available tone generators have been assigned and a new note switch is actuated, a "DEMAND" signal is generated and appears as input data to phase state memory 230. A search is made to determine if any note on the corresponding division is in phase state 6. If none is in phase state 6, then 5 and then 4 is investigated. The priority of control being phase states 6, 5, 4. When such a note is found a NAU (note available upper, assuming demand corresponded to the upper division) is created. The NAU causes the ADSR clocks 231 associated with the upper division to increase in frequency thereby quickly causing the corresponding note to finish its release and permitting a new note to be rapidly assigned to the tone generating systems. If the note is in phase state 4, a NOTE RELEASE signal is automatically generated and the phase state is incremented to 5.

Figure 12:
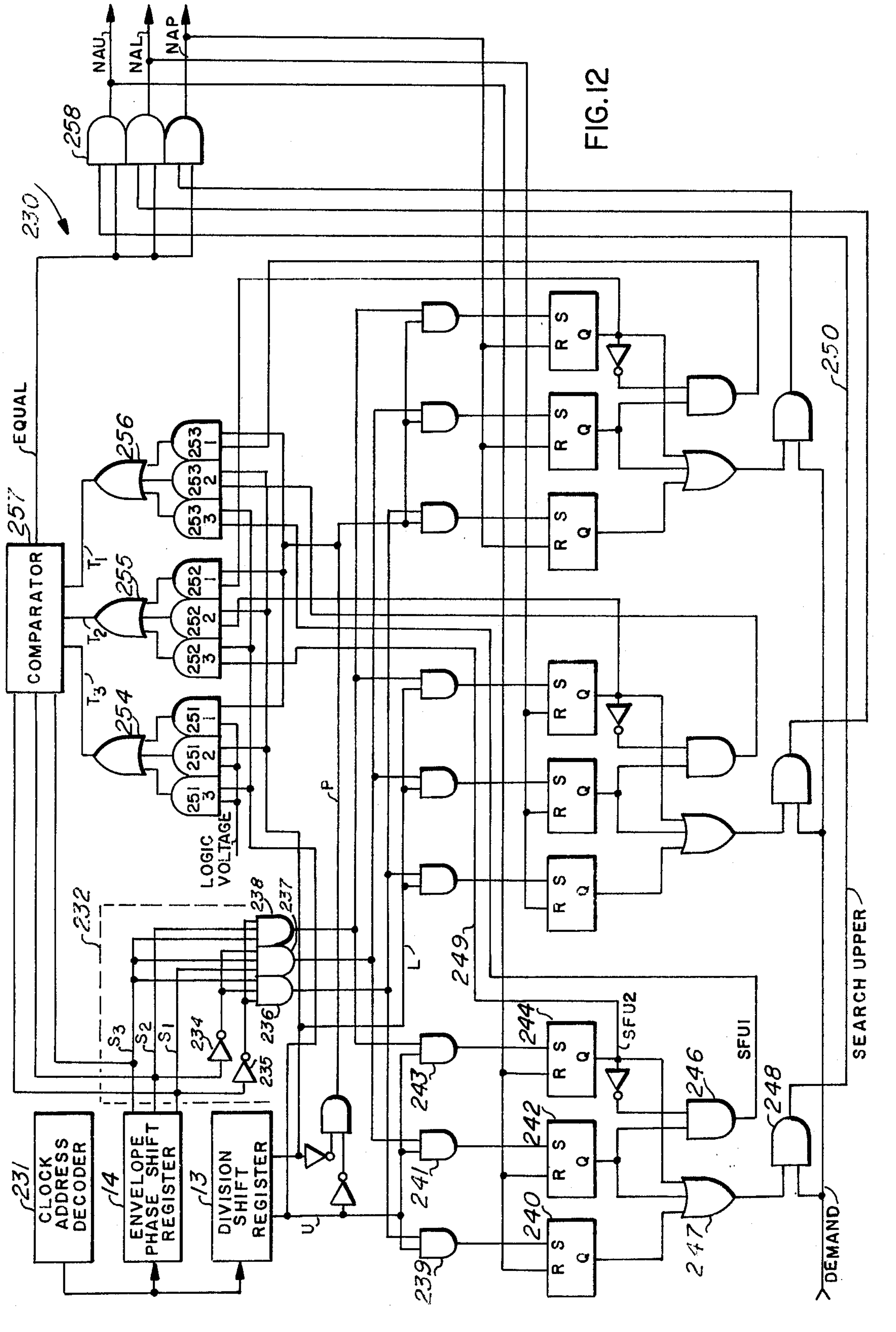
FIG. 12 is a logic diagram for a phase state memory latching system.

FIG. 12 shows the logic comprising phase state decoder 232 and phase state memory 230.

Invertors 234 and 235 in conjunction with AND gates 236, 237, and 238 decode phase states 4, 5, 6 and comprise phase state decoder 232.

If the output S from envelope phase shift register 14 is for state 4 as decoded by AND gate 236 and the division signal DIV read from division shift register 13 is U (upper division), then AND gate 239 causes flip-flop 240 to be set. Similarly, if state 5 is decoded by AND gate 237 and $DIV=U$, then AND gate 241 causes flip-flop 242 to be set. If state 6 is decoded by AND gate 238 and $DIV=U$, then AND gate 243 causes flip-flop 244 to be set.

If in any one complete scan of the shift registers a phase state 6 has been detected, flip-flop 244 is set and a "1" signal appears on line 249. That is $SFU2=1$. If state 5 has been detected and no state 6 has been detected, AND gate 246 causes $SFU1=1$.

If in any scan of the shift registers, any state 4, 5, or 6 is detected as being assigned to the upper division and "DEMAND" signal is present, then AND gate 248 and OR gate 247 cause the "SEARCH UPPER" signal to be created on line 250.

AND gates 251-1, 251-2, 251-3 and OR gate 254 cause $T_3=1$ for each division number read out from division shift register 13.

If DIV corresponds to U, then AND gate 252-3 and OR gate 255 transfer $SFU2$ to $T_2$. Similarly if DIV corresponds to U, then AND gate 253-3 and OR gate 256 transfer $SFU1$ to $T_1$.

Analogous gates, and logic are shown for the lower and pedal divisions. Their functions are the same as those described for their upper division counterparts.

$T_3$, $T_2$, $T_1$ represent the state of the phase states for the upper manual read out during a shift register scan with phase state 6 having priority over 5, and 5 having priority over 4. Only the state having priority is transferred to $T_3$, $T_2$, $T_1$. A similar priority state transfer occurs when a division state L (lower) and a division state P (pedal) is read out from division shift register 13.

The priority phase state $T_3$, $T_2$, $T_1$ is compared with the current read phase state $S_3$, $S_2$, $S_1$ by comparator 257. If the comparison indicates identical states an "EQUAL" signal is created.

Figure 13:
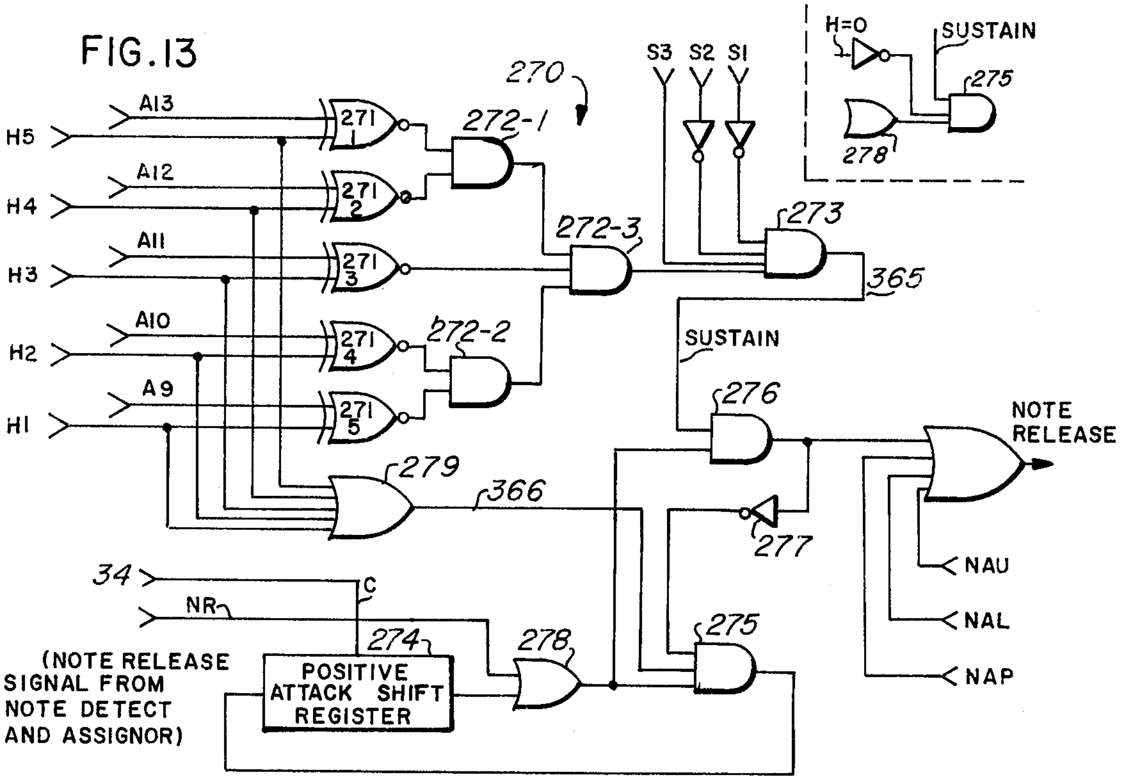
FIG. 13 is the logic for positive attack.

If "EQUAL" has been generated and if "SEARCH UPPER" exists on line 250, then AND gate 258 creates an NAU signal on line 259. When NAU appears on line 259, the ADSR clocks associated with the upper division are caused to increase their frequency so that the corresponding note is rapidly caused to transfer to the end of phase state 6 and thereby its associated tone generating circuitry is made available to the note that caused the generation of the "DEMAND" signal. Signal NAU, and its counterpart signals NAL and NAP for the lower and pedal division are used as shown in FIG. 13 to automatically create a NOTE RELEASE signal which forces a note out of state 4, if it was in state 4, and causes the state to increment to state 5.

NAU is also used to reset the phase state flip-flops 240, 242, and 244 which are associated with the upper division.

The new amplitude function values as they are generated are furnished to amplitude utilization means via line 12 as shown for system 10 in FIG. 1. The amplitude utilization means can consist of a binary multiplier for forming the product of the ADSR amplitude function and the harmonic coefficients as described by Deutsch in U.S. Pat. No. 3,809,786. The inventors described an amplitude utilization means in the copending U.S. patent application Ser. No. 603,776 filed on Aug. 11, 1975 entitled POLYPHONIC TONE SYNTHESIZER. In the latter system, the binary ADSR amplitude function signals are converted to analog signals by means of a digital-to-analog convertor. The resulting analog signals are then used as the reference voltage for a second digital-to-analog convertor whose function is to convert the binary digital data words representing musical waveshapes to analog musical waveshapes suitable for driving a sound system. In each of these amplitude utilization means, provision is made for time sharing so that the ADSR envelope generator is capable of being used in conjunction with a polyphonic tone generating system.

It is not usually required to convert the full 13 bits used to represent the amplitude A. This number of bits was used to permit small increments in the amplitude to be added without premature round-off of small numbers. Advantageously only the eight most significant bits of the amplitude A are converted to analog signals by means of the above mentioned digital-to-analog convertor.

System 10 shown in FIG. 1 includes a "positive attack" feature introduced by means of the system logic block, positive attack 270. This logic block compares the selected value of the curve shape parameter H with the current value of amplitude A read out from amplitude shift register 15. If the current amplitude function corresponds to envelope phase state $S=4$ and is $A=H$, then a "Note Release" signal is created in response to a release signal NR received from a key detect and assignor system. The "Note Release" signal is used by comparator 29 as described previously. If, on the other-hand, the state S is either a 1, 2, or 3, or $S=4$ and A is not equal to H, then the NR signal is retained in temporary memory storage until the particular note has its amplitude function advanced to phase state 4 and $A=H$ in the normal fashion by the corresponding division attack timing clock, as previously described, at which time the NOTE RELEASE signal is created.

FIG. 13 shows the logic comprising the positive attack 270 subsystem logic block. EX-OR gates 271-1 through 271-5 in conjunction with AND gates 272-1 through 272-3 comprise a binary data signal comparator. This comparator compares a selected value of H read out from scale select 35 (FIG. 1) with the five most significant bits of the current amplitude value A read out from amplitude shift register 15.

AND gate 273 will create a "1" signal if the current state phase S read out from envelope phase shift register 14 has the value $S=4$ and if the comparator shows equality.

Positive attack shift register 274 is a shift register having 12 one bit words. Each such word corresponds to the words contained in the other shift registers shown in FIG. 1 and previously described.

AND gate 276 will generate the "NOTE RELEASE" signal if the output from AND gate 273 is a "1" and if the current word read out from positive attack shift register 274 is a "1" as transmitted via OR gate 278.

If the "NOTE RELEASE" signal is not created, then invertor 277 sends a "1" signal to AND gate 275. If any of the bits $H_5$, $H_4$, $H_3$, $H_2$, $H_1$ is a "1" signifying that H is not zero, then OR gate 279 sends a "1" signal to AND gate 275. Therefore, if the current stored data read out from positive attack shift register is a "1" or if NR is received from the Note Detect and Assignor, and if H is not zero and if a NOTE RELEASE has not been generated, then AND gate 275 creates a "1" signal which is stored in positive attack shift register 274. If the preceding conditions do not occur, then a "0" signal is caused to be stored in this shift register.

Figure 14:
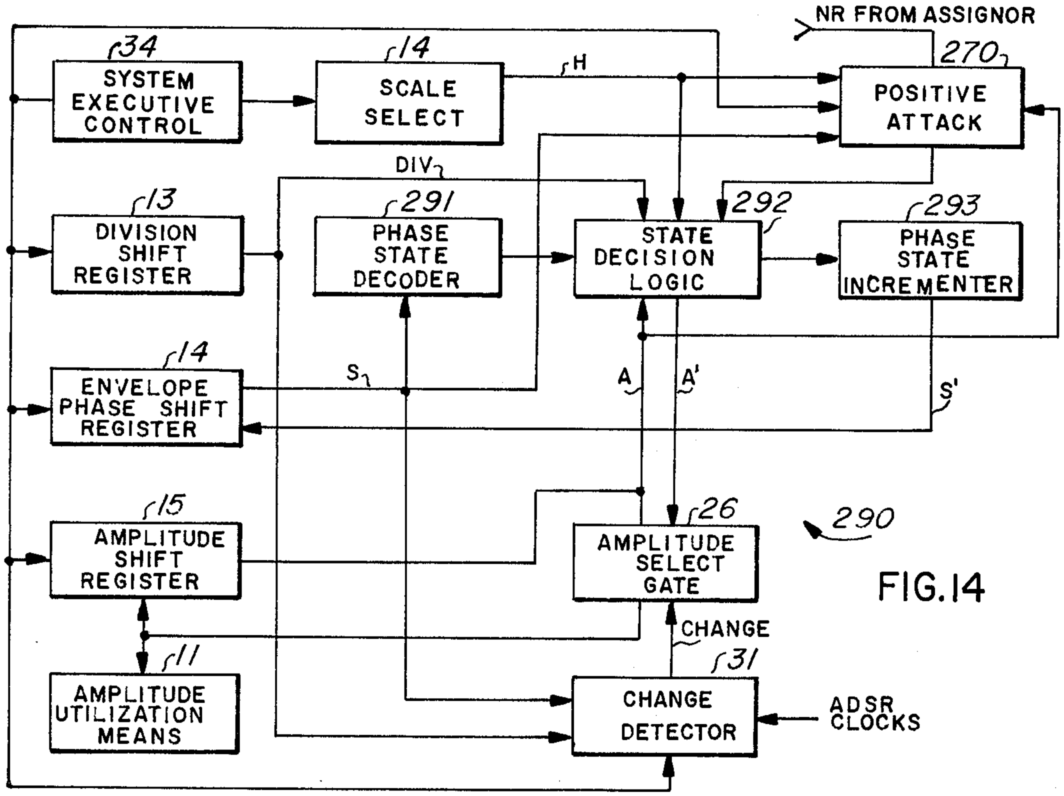
FIG. 14 is an electrical block diagram of an alternative implementation of an ADSR envelope generator.

System 290 shown in FIG. 14 is an alternate means for implementing system 10 of FIG. 1. System 290 avoids several of the algorithmic computations used in system 10 by restricting the amplitude curve parameter to a few selected values of H. Advantageously these values are $H=\frac{1}{2}$, $H=1$, and $H=0$. Inspection of Table 3 shows that for the illustrative case of $H=\frac{1}{2}$, rather simple progressions occur for the bits in the amplitudes represented as binary digits. System 290 is a means for utilizing the simple bit progressions. While other values of H can be implemented, the most musically useful cases $H=\frac{1}{2}$, $H=1$, and $H=0$ are particularly simple and require essentially the same logic circuits.

In system 290 of FIG. 14, phase state decoder 291 decodes the binary number S for the phase state read out from envelope phase shift register 14. State decision logic 292 receives the current amplitude data read out from amplitude shift register 15, the current phase state data decoded by phase state decoder 291, the DIV signal from division shift register 13, the selected value of H for the current division data and the NOTE RELEASE signal from positive attack 270. Using these data, state decision logic 292 utilizes the algorithm listed in Table 4 to form an updated amplitude value A' and to provide data to change the phase states when such change is required.

Figure 15:
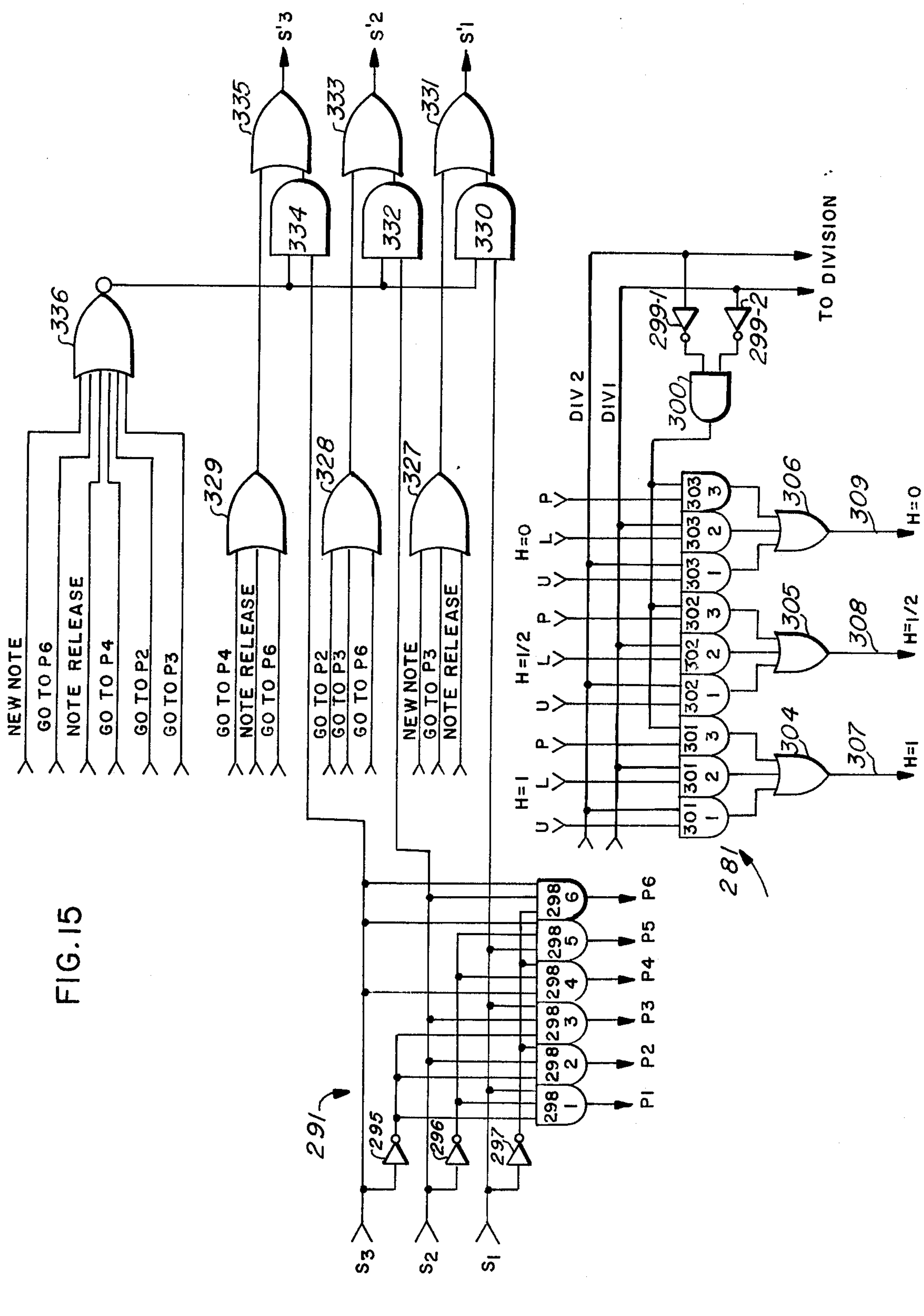
FIG. 15 is a logic diagram of the phase state modification.
Figure 16:
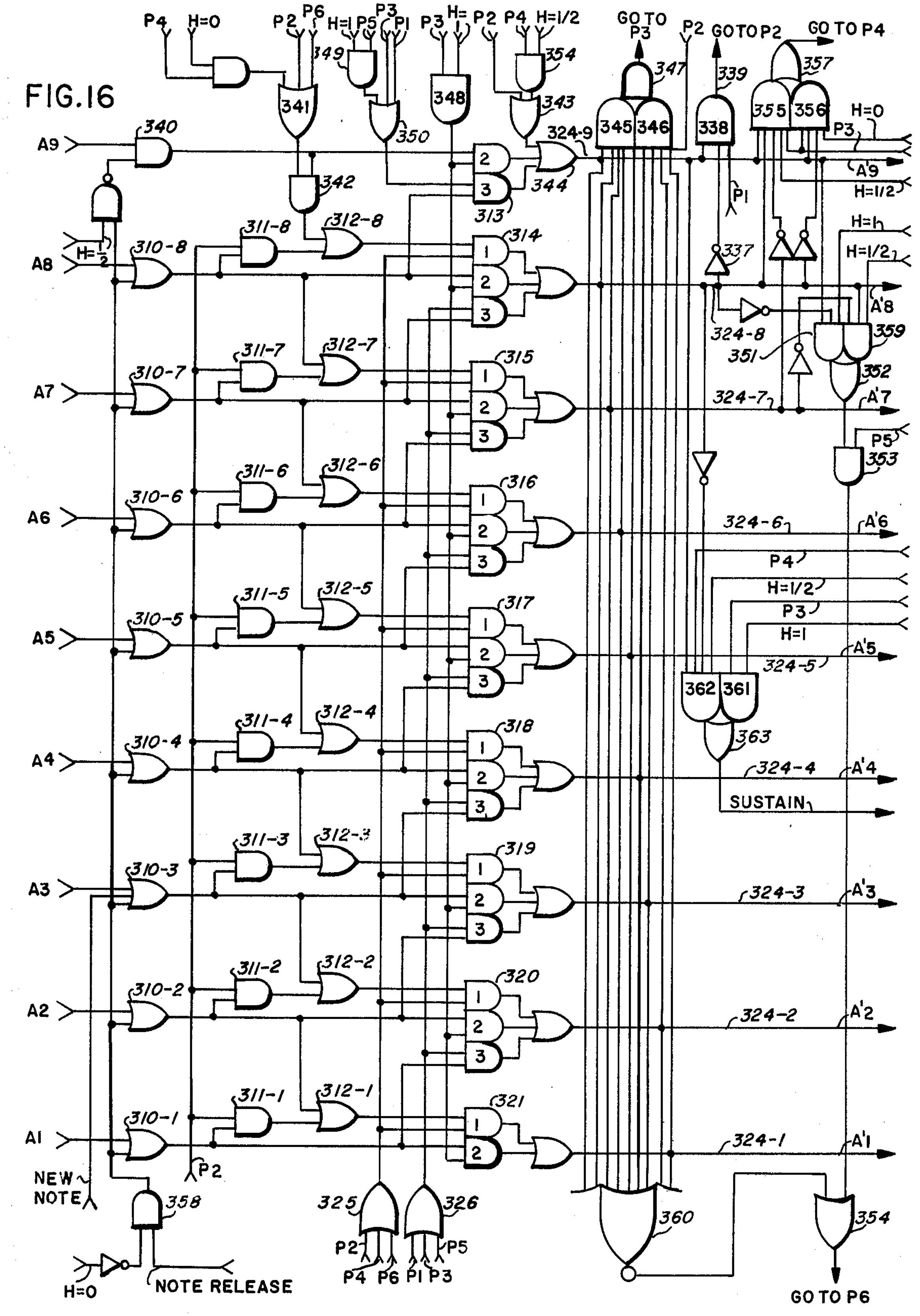
FIG. 16 is a logic diagram of the amplitude generator.

FIGS. 15 and 16 show the logic used to implement phase state decoder 291, state decision logic 292 and phase state incrementer 293. This logic is a means for implementing Table 4.

Invertors 295, 296, 297 in conjunction with AND gates 298-1 through 298-6 comprise a binary to decimal convertor for decoding the phase states $P_1$, $P_2$, $P_3$, $P_4$, $P_5$, $P_6$ from the binary phase data signal $S=S_1, S_2, S_3$.

The gate logic 281 provides a means for transferring values of H via lines 307, 308, 309 to the remainder of the state decision logic such that the values of H are those selected by the musician for notes played on the upper, lower, and pedal divisions. When DIV corresponds to U (upper) division, AND gates 301-2, 302-2, and 303-2 transfer the preselected value of H for the lower division to one of the lines 307, 308, 309. When DIV corresponds to P (pedal) division, invertors 299-1 and 299-2 in conjunction with AND gate 300 decode the P division signal and AND gates 301-3, 302-3, and 303-3 transfer the preselected value of H for the pedal division to one of the output lines 307, 308, 309.

The logic shown in FIG. 16 will first be described for the situation in which the curve shape parameter H has been chosen to be $H=1$ for all divisions. The algorithm will be described for a single note played on the upper division, the extension to a multiplicity of the 12 notes being apparent.

When a note has been detected on a keyboard of the musical instrument, the "NEW NOTE" signal is created. Table 4 shows that the stored amplitude for all new notes is initialized to $A_2=1$ and all other bits equal to "0" and the phase state is caused to be $P_1$ (phase 1). This initialization is accomplished by the $P_6=1$ signal transferred via OR gate 325 to AND gate 320-1 which receives the NEW NOTE signal "1" via OR gate 310-3 and OR gate 312-2. The net result is that a "1" signal appears on line 324-1 for $A_2'$ and all other $A_j'$ bits are "0". This value of A' is stored in amplitude shift register 15. In FIG. 15 the NEW NOTE signal is transferred via OR gate 327 and 331 to cause the state bit $S_1'=1$. Since no other output OR gates 333 and 335 have an input signal, the net result is that the new phase state has been caused to be $S$ =0,0,1, or phase state 1.

The next time the stored value of A' is read out of the amplitude shift register it is denoted as current amplitude value A. The note is now in phase state $P_1$ so that OR gate 326 passes a "1" signal which is sent to AND gates 314-3 through 321-3. The presence of this "1" signal causes a binary left shift of the data bits $A_9 \ldots A_1$. For example, the signal $A_2=1$ is transferred to AND gate 319-3 via OR gate 310-2 and thereupon appears on line 324-3 as signal $A_3'=1$ which is a left shift of one data bit position.

The succeeding actions within the steps of phase state 1 continue in the same fashion by causing successive left shifts until that time at which $A_8=1$ and is transferred to output line 324-9 to cause $A_9'=1$. At this instant AND gate 338 will create a GO TO P2 signal since its first input is $A_9'=1$; $A_8'=0$ so that the invertor 337 causes the second input signal to be "1", and third input signal is $P_1=1$. In FIG. 15, GO TO P2 is a "1" which causes $S_2'$ to be a "1" and $S_1'=S_3'=$"0" so that a state $S=2$ signal is created and stored in envelope phase shift register 14.

TABLE 4

| H | PHASE STATE | AMPLITUDE ALGORITHM | END OF STATE DETECTION |
|---|---|---|---|
| 1 | 1 | Left shift of A | If in state $P_1$ and $A_9=1$ and $A_8=0$, then go to state $P_2$ |
| 1 | 2 | Change leftmost "0" bit of A to "1" | If all bits of A are "1" and in state $P_2$, then go to state $P_3$ |
| 1 | 3 | A remains constant | When NOTE RELEASE is detected go to state $P_5$ (A is initialized to all "1"s) |
| 1 | 5 | Left shift of A | When "NOTE RELEASE" signal is detected then go to state $P_5$ (A is initialized to all "1" bits) |
| 1 | 6 | Right shift of A | When new note is detected, A is initialized to $A_1=1$, and all other bits to "0", then go to state $P_2$ |
| ½ | 1 | Left shift of A | If in state $P_1$ and $A_9=1$ and $A_8=0$, then go to state $P_2$ |
| ½ | 2 | Change leftmost "0" bit of A to "1" | If all bits of A are "1" and in state $P_2$, then go to state $P_3$ |
| ½ | 3 | Left shift of A | When in $P_3$ and $A_9=A_8=$"1" and $A_7=$"0", then go to $P_4$ |
| ½ | 4 | Right shift of first 8 bits of A (A remains "1") | When "NOTE RELEASE" is detected, then go to state $P_5$ and initialize $A_9$ to "0" and all other bits to "1" |
| ½ | 5 | Left shift of first 8 bits of A ($A_9$ remains "0") | When in $P_5$ and $A_8=$"1" and $A_7=$ "0" then go to $P_6$ |
| ½ | 6 | Right shift of A | When new note is detected, set A is initialized to $A_1=1$ and all other bits to "0", then go to state $P_1$ |
| 0 | 1 | Left shift of A | If in state $P_1$ and $A_9=1$ and $A_8=0$, then go to state $P_2$ |
| 0 | 2 | Change leftmost "0" bit of A to "1" | If all bits of A are "1" and in state $P_2$, then go to state $P_3$ |
| 0 | 3 | Left shift of A | If in $P_3$ and $A_9=$"1" and $A_8=$"0" then go to $P_4$ |
| 0 | 4 | Right shift of A | If all bits of A are "0", then go to $P_6$ |
| 0 | 6 | Right shift of A | Remain in $P_6$ until new note is detected and assigned |

The U division note being examined has now been placed in phase state $P_2$. In FIG. 16, OR gate 325 transfers the $P_2=1$ signal when it arrives to AND gates 314-1 through 321-1. Similarly a $P_2=1$ signal is applied to AND gates 311-1 through 311-8. All the bit positions for A are "0" except that $A_9=$"1". OR gate 341 passes the $P_2=1$ signal to one of the inputs of AND gate 342. The second signal to AND gate 342 is $A_9=1$, so that a "1" signal is created by AND gate 342 and transferred to line 324-8 via OR gates 312-8 and 314-1 thereby making $A_8'=1$. The $P_2=1$ signal is transferred to output line 324-9 via OR gates 343 and 344 thereby creating $A_9'=1$. All the remainder of the A ' bit positions will be "0". This condition corresponds to step 9 listed in Table 3.

During the next step for the note in phase state $P_2$, the actions of the preceding paragraph are repeated so that the result is again $A_9'=A_8'=1$. In addition, because $A_8$ is a "1", this signal is transferred to line 324-7 via OR gate 312-7 and AND gate 315-1 to make $A_7'=1$.

The preceding action is iterated for successive steps yielding the sequence of bit positions shown in Table 3 for steps 9 through 17. At step 17 all the bit values of A' will be "1". This condition is detected by thetree of AND gates 345, 346, and 347 and causes a GO TO $P_3$ signal to be generated. In FIG. 15, because GO TO $P_3$ has been created it causes $S_2'=$"1" via OR gate 333 and $S_1'=$"1" via OR gate 331. Therefore, $S$=0,1,1 or phase state 3 is placed in storage.

During phase state $P_3$ and for $H=1$, AND gate 358 causes a "1" signal to be one of the inputs to AND gates 313-2 through 321-2. Therefore, the input signals $A_1$ through $A_8$ are transferred via OR gates 310-1 through 310-8 and AND gates 313-2 through 321-2 to the output lines so that each input bit position is transferred unchanged to the output bit position lines. $A_9=1$ is also transferred unchanged to $A_9'$ via AND gates 340 and 313-2. The net result is that for each step of phase $P_3$, the amplitude function remains at its maximum value.

The note remains in state 3 until the musician releases the note. This release is detected by the note detect and assignor which generates the NOTE RELEASE signal.

In FIG. 15, when NOTE RELEASE is present, OR gates 329 and 335 cause $S_1'=1$. $S_2'=0$ and $S_3=1$ therefore the system is placed in phase 5; $P_5=1$.

The logic shown in FIG. 16 for phase state $P_5=1$ will retrace, in reverse order, the logic for steps 1 through 16. For $P_5=1$, OR gate 326 places a "1" signal as one of the inputs to AND gates 314-3 through 320-3. Since $H=1$ and $P_5=1$, then AND gate 349 creates a "1" signal which appears as one of the signal inputs to AND gate 313-3 via OR gate 350. The second signal is $A_8=1$ which is transferred via OR gate 310-8. Therefore, a "1" signal is created by AND gate 313-3 and transferred to output line 324-9 to make $A_9'=1$. All the bits $A_2$ through $A_7$ will be transferred as left binary shift to the corresponding output data bits $A_3'$ through $A_8'$. Signal $A_1'$ will be a "0". The new result is the binary bit pattern shown in Table 3 for step 15.

For each succeeding step for phase state 5 and $A=1$, a left shift of A will occur. Phase state 5 will be terminated when the input data bit has $A_9=1$ and all other input bit positions have a "0". This condition is detected by AND gate 351 which will have a "1" for its three input signals so that a "1" signal is created and sent to AND gate 353 via OR gate 352. Since $P_5=1$, AND gate 353 will transmit a "1" signal to OR gate 354 and thereby create the GO TO $P_6$ signal.

In FIG. 15, when the GO TO $P_6$ signal is "1", then $S_3'=S_2'=1$ and $S_1'=0$ placing the phase state value S=6 in envelope phase shift memory.

As described previously, when $P_6=1$ and $H=1$, the logic shown in FIG. 16 causes A' to be a binary right shift of the input data A. These binary right shift are accomplished for each step of phase state 6 until the output amplitude $A'=0$. At this step, system 290 can continue to operate indefinitely in phase state 6 for the corresponding note or a zero value of A detection logic could be used to provide an "end of release" signal for use by the note detect and assignor to signify that the logic assigned to the note can be reassigned to a newly actuated note.

Next the logic shown in FIGS. 15 and 16 are described for the case in which a note is played on a division for which the value $H=\frac{1}{2}$ has been selected. For phases 1 and 2 the steps previously described for the same phases and $H=1$ are repeated.

When step 16 has been reached, the system is again placed in phase state 3. Since now $H=\frac{1}{2}$, the steps in phase state 3 will differ from those previously described for the situation when $H=1$. Since $P_3=1$, OR gate 326 will cause a "1" signal as one of the inputs to AND gates 314-3 through 320-3. Bit $A_1=1$ will not be transferred to line 324-1 so that $A_1'=0$. Bit position $A_1$ through $A_7$ will undergo a right binary shift of one position and appear as the corresponding output bits $A_2'$ through $A_8'$. A "1" signal will be transferred via OR gate 350 to AND gate 313-3. Therefore input bit $A_8=1$ will be right shifted to $A_9'$ via OR gate 344.

The above right shift action will be repeated for each step of phase state 3 for $H=\frac{1}{2}$. The end of phase state 3 is detected when $A_9=A_8=1$ and $A_7=0$. This condition is detected by AND gate 355 which creates a GO TO $P_4$ signal transferred via AND gate 357.

The state logic of FIG. 15 shows that the GO TO $P_4$ signal causes $S_3'=1$ and $S_2'=S_1'=0$ which places the phase state in state 4 for the note.

When $P_4=1$, OR gate 325 in FIG. 15 places a "1" signal on AND gates 314-1 through 321-1. In conjunction with OR gates 312-7 through 312-1, the result is a right binary shift of input data bits $A_8$ through $A_2$ which appear as the corresponding output data bit $A_7'$ through $A_1'$. No data bit is transferred to line 324-8, so $A_8'=0$. Or gate 354 has a "1" signal for both inputs, therefore a "1" signal is transferred to output data line 324-9 via OR gate 344 making $A_9'=1$. The net result is the binary bit pattern shown in Table 3 for step 25.

For the remainder of the steps in phase state 4 the same action is iterated as described above. A right binary shift is effected and $A_9'$ is kept at a "1" value. Phase 4 continues as long as the note is actuated on the instrument. A constant condition is reached at step 32, at which time $A_9'=1$ and all other bit positions are "0".

When the note is released, a $P_5=1$ signal is created as described previously for the situation in which $H=1$. When $P_5=1$, OR gate 326 transfers a "1" signal to one of the inputs of AND gates 314-3 through 320-3. The NOTE RELEASE signal transferred via AND gate 358 effectively causes all values of input data $A_8$ through $A_1$ to be "1" by the signal transfer through OR gates 310-1 through 310-8. Thus the "1" bits $A_1$ through $A_7$ are left shifted to appear as output data bits $A_2'$ through $A_8'$. $A_1'$ will be "0" as no signal is transferred to output data line 324-1. Similarly $A_9'$ will be a "0" because no signal is transferred to output data line 324-9 for $P_5=1$ and $H=1$.

For the remainder of the steps in phase state 5 the same action is iterated as described above in that a left binary shift is accomplished at each step while $A_9'$ is maintained as "0".

Phase 6 will be entered for $H=\frac{1}{2}$ when $A_8'=1$ and $A_7'=0$ as shown in Table 3 for step 408. This condition is detected by AND gate 359 which transfers the detection signal to AND gate 353 via OR gate 352. Since the current state value is $P_5$, AND gate 353 sends a "1" signal to OR gate 354 and thereby the GO TO $P_6$ signal is created which causes $S_3'=S_2'=1$ and $S_1'=0$ as shown in FIG. 14.

During phase state 6, OR gate 325 causes a "1" signal to be sent to one input of AND gates 314-1 through 321-1. The net result, as described above for case $H=1$, is that for each step in phase state 6 the output A' is a right binary shift of one bit position of the input binary data A.

The logic shown in FIGS. 15 and 16 is next examined for a note for which the value $H=0$ has been selected. Examination of the logic shown in FIG. 15 demonstrates that the steps for phase state 1 and 2 for the case $H=0$ are identical to those for the same phase state steps when $H=\frac{1}{2}$ as previously described. Moreover, the detection of the end of phase state 3 and the creation of phase state 3 and the generation of the signal $P_3=1$ are also identical to the situation when $H=\frac{1}{2}$. During the steps of phase state 3 and $H=0$, a left binary shift of input data set A occurs in the same fashion as for the case $H=\frac{1}{2}$.

The end of phase state 3 for $H=0$ occurs when $A_9'=1$ and $A_8'=0$. This end condition is detected by AND gate 356, which creates a "1" signal that when transferred by OR gate 357 becomes the GO TO $P_4$ signal.

During phase state 4 for $H=0$, OR gate 325 transfers a "1" signal to one of the input terminals of AND gates 314-1 through 321-1. Thus, as described previously, a right binary shift of the input data A will be transferred to the output data A' for each step of phase state 4.

The end of phase state 4 for $H=0$ occurs when all the bits of output amplitude A' are "0". This end condition is detected by NOR gate 360. For $H=0$, phase state 5 is never entered and the system is immediately placed in phase state 6 to await the detection and assignment of a new note.

AND gates 361 and 362 create the SUSTAIN signal used by positive attack 270. AND gate 361 creates this signal for the case $H=1$ and $P_3=1$, signifying that the amplitude function has finished its attack phase. Similarly, AND gate 362 creates the SUSTAIN signal when $H=\frac{1}{2}$ and $P_4=1$. Positive attack is not used for the case in which $H=0$. Because some of the logic shown in FIG. 13 is duplicated in FIG. 15 and FIG. 16, when positive attack is used in conjunction with system 290, the line 365 leading from AND gate 273 is removed and the "SUSTAIN" signal from OR gate 363 is connected to AND gate 276. In addition, the line 366 leading from OR gate 279 is removed and the signal $H=0$ is inverted and used as the replacement signal input to AND gate 275. These changes are shown in FIG. 13*b*.

The logic shown in FIG. 16 for system 290 can be readily modified to encompass other amplitude function curves and to provide for additional values of H. Skip logic can be employed with both systems 10 and 290 to cause selected phase states to be eliminated. For example, it may be desirable for musical effects to go directly from state 2 to state 5. Such state skipping is accomplished by preventing the state number S from having values 3 and 4.

While the subject invention was described in combination with the keyboard Switch Detect and Assignor, it is not thereby intended to be limited to such a system.

Intending to claim all novel, useful and unobvious features shown or described the applicants claim:

1. In an electronic musical instrument having keying means operable between actuated and released conditions for selecting notes to be generated and having a plurality of tone generators no greater in number than the number of notes which said instrument is capable of generating, a system for simulating the regions of attack, decay, sustain and release envelope amplitude variations of notes generated by said musical instruments comprising;

a second memory means for storing said amplitude variation data to be thereafter read out, third memory means for storing phase state data to be thereafter read out, master clocking means for generating logic timing signals, memory decoding means responsive to said logic timing signals whereby said amplitude variation data corresponding to the same member of said plurality of tone generators is caused to be read out from said second memory means and said third memory means, scale selection means whereby an amplitude variation curve shape parameter is selected, first computation means responsive to said amplitude variation data read out from said second memory means and to said phase state data read out from said third memory means, and to said selected amplitude variation curve shape parameter wherein a new amplitude variation is generated, first decision means responsive to said selected amplitude variation curve shape parameter wherein an initialized amplitude is generated, and wherein in response to data read out from said second memory means and said third memory means a selection is made between said new amplitude variation and said initialized amplitude, second decision means responsive to said logic timing signals wherein a selection is made between said new amplitude variation or said initialized amplitude selected by said first decision means and said amplitude variation data read out from said second memory means, and wherein said selection made by second decision means causes selected data to be stored in said second memory means, phase state modification means responsive to said first decision means wherein said phase state data read out from said third memory means is modified and caused to be stored in third memory means, and amplitude utilization means wherein said selected data selected by said second decision means is utilized by said member of said plurality of tone generators to create envelope response of attack, decay, sustain, and release amplitude variations of the corresponding musical waveshape.

2. In an electronic musical instrument according to claim 1 wherein said phase state data comprises selected numbers from a multiplicity of phase state numbers designating corresponding segments of said attack region of musical waveshape amplitude variation, a multiplicity of phase state numbers designating corresponding segments of said decay region of said musical waveshape amplitude variation, and a multiplicity of phase state numbers designating corresponding segments of said release region of said musical waveshape amplitude variation.

3. In an electronic musical instrument according to claim 2 wherein said keying means further comprises;

assignment means wherein a member of said plurality of tone generators is assigned to an actuated key and wherein in response to said assignment a new note signal is created, and wherein a note release signal is created when said actuated key is released, and initial circuitry means wherein in response to said new note signal the smallest number of said phase state numbers corresponding to said attack region is caused to be stored in said third memory means and wherein in response to said note release signal the smallest number of phase state numbers corresponding to said release region is caused to be stored in said third memory means.

4. In an electronic musical instrument according to claim 1 wherein said scale selection means further comprises;

scale memory means for storing plurality of values of said variation curve shape parameters, and selection control means wherein selected values of said amplitude variation curve shape parameters are caused to be read out of said scale memory means.

5. In a musical instrument according to claim 3 wherein said phase state data further comprises selected numbers from phase state numbers 1 and 2 designating corresponding segments of said attack region, selected numbers from phase state numbers 3 and 4 designating corresponding segments of said decay region, and selected numbers from phase state numbers 5 and 6 designating corresponding segments of said release region.

6. In a musical instrument according to claim 3 wherein said first computation means further comprises amplitude evaluation circuitry for computing said new amplitude variation A' in accordance with the recurrence relation $$A' = KA + N$$

where $A$ is said amplitude variation data read out from said second memory means and $N$ and $K$ are values selected from a set of constant values.

7. In a musical instrument according to claim 5 wherein said first computation means further comprises;

amplitude evaluation circuitry for computing said new amplitude variation A' in accordance with the recurrence relation $$A' = KA + N$$

where $A$ is said amplitude variation data read out from said second memory means, $N$ and $K$ are values selected from a set of constant values; for said phase state number 1, $K=2$, $N=0$; for phase state number 2, $K=\frac{1}{2}$, $N=\frac{1}{2}$; for phase state number 3, $K=2$, $N=-1$; for phase state number 4, $K=\frac{1}{2}$, $N=H/2$; for phase state number 5, $K=2$, $N=-H$; for phase state number 6, $K=\frac{1}{2}$, $N=0$; and where $H$ is said amplitude variation curve shape parameter selected by said scale selection means.

8. In a musical instrument according to claim 7 wherein said amplitude evaluation circuitry further comprises;

binary data shifting circuitry whereby KA term of said recurrence relation is evaluated from said amplitude variation data A read out from said second memory means by causing a left binary shift of one bit position of binary bits representing A in response to a "1" in the least significant bit of said phase state data read out from said third memory means and by causing a right binary shift of one bit position in a response to "0" in said least significant bit.

9. In a musical instrument according to claim 7 wherein said first decision means further comprises;

initial amplitude evaluation circuitry responsive to said amplitude variation curve shape parameter H selected by said scale selection means and to said phase state data read out from said third memory means wherein for said phase state number equal to 1 an initial amplitude value $A_{01}$ is evaluated in accordance with the relation $$A_{01} = \tfrac{1}{2}\, 2^{-B}$$

where $B=2^{k-1}-1$ and $k$ is the number of computation steps comprising said attack region, wherein for said phase state number equal to 3 an initial amplitude value $A_{03}$ is evaluated in accordance with the relation $$A_{03} = 1 - A_{01}(1 - H),$$

and wherein for said phase state number equal to 5 an initial amplitude value $A_{05}$ is evaluated in accordance with the relation $$A_{05} = H(1 - A_{01});$$

and end amplitude evaluation circuitry responsive to said amplitude curve shape parameter H and said phase state data wherein end amplitudes $A_{Ej}$ are generated for phase state $j$ in accordance with the relations $$A_{E1} = \tfrac{1}{2}$$

$$A_{E2} = 1$$

$$A_{E3} = (1 + H)/2$$

$$A_{E4} = H$$

$$A_{E5} = H/2\,.$$

10. In a musical instrument according to claim 9 wherein said first decision means further comprises;

comparator means wherein a YES signal is created when said amplitude variation data A read out from said second memory is equal to said end amplitude value $A_{0j}$, where index $j$ is said phase state $j$, or said new note signal is created or said NOTE RELEASE signal is created, and envelope initializer means responsive to said YES signal wherein if YES signal is created and said phase state number is 0, 2, or 4, said initial value $A_{0(j+H)}$ is selected and wherein if YES signal is not created or said phase number is 1, 3, or 5, said new amplitude A' is selected.

11. In a musical instrument according to claim 10 wherein said master clocking means further comprises;

a multiplicity of frequency adjustable timing clocks wherein each member of said multiplicity can be associated with each said phase state read out from said third memory means.

12. In a musical instrument according to claim 11 wherein said memory decoding means further comprises;

memory addressing circuitry whereby said amplitude variation data stored in said second memory means and said phase state data stored in said third memory means are read out repetitively in response to said master clocking means thereby sequencing through data corresponding to each member of said plurality of tone generators.

13. In a musical instrument according to claim 12 wherein said second decision means further comprises;

timing signal memory means comprising a multiplicity of signal storage means associated with corresponding members of said multiplicity of frequency adjustable timing clocks wherein signals created by said frequency timing clocks are stored to be thereafter read out, phase selection means wherein in response to said phase state data read out from said third memory means selection is made from contents read out of said signal storage means, second amplitude selection means wherein in response to a nonzero value in said signal storage means selected by said phase selection means said new amplitude A' from said envelope initializer means is selected and wherein in response to a zero value in said signal storage means selected by said phase selection means said data read out from said second memory means is selected, and storage means wherein data selected by said second amplitude selection means is caused to be stored in said second memory means.

14. In a musical instrument according to claim 10 wherein said phase state modification means further comprises;

incrementer means wherein said phase state data P read out from said third memory means is incremented to next succeeding phase state number P′ in response to said YES signal created by said envelope initializer, in accordance with the relation $$P' = 1 + P(\text{modulo } 6)$$

when said new amplitude A′ is selected by said second decision means.

15. In a musical instrument according to claim 13 wherein said plurality of tone generators create analog musical waveshapes and wherein said amplitude utilization means further comprises;

a digital-to-analog convertor wherein binary data words representing said data caused to be stored by said storage means is converted to an analog voltage for utilization by said plurality of tone generators thereby effecting envelope response of said muscial waveshape.

16. In a musical instrument according to claim 13 wherein said plurality of tone generators create digital samples of musical waveshapes and wherein said amplitude utilization means further comprises;

scaling means whereby said digital samples of musical waveshapes are weighted by binary data words representing data caused to be stored by said storage means thereby effecting envelope response of said musical waveshapes.

17. The combination according to claim 2 wherein said keying means further comprising an assignment means wherein DEMAND signal is created when said plurality of tone generators has been assigned to actuated keys and an additional key is actuated, said combination further comprising;

memory addressing circuitry whereby data stored in said second memory means, and said third memory means are read out repetitively in response to said master clocking means thereby sequencing through data corresponding to each member of said plurality of tone generators, phase state memory means comprising a multiplicity of phase storage means corresponding to a set of phase state numbers for storing said phase state data read out from said third memory means by said memory addressing circuitry, and priority circuitry means wherein a priority is established amongst said phase state data stored in said phase storage means, and said priority ranging from highest to lowest priority, and initializing circuitry wherein in response to said DEMAND signal said data read out from said second memory means corresponding to said highest priority phase data is caused to be initialized to zero value and wherein corresponding said highest priority phase state is initialized to said lowest priority.

18. The combination according to claim 1 wherein said keying means further comprises an assignment means wherein a DEMAND signal is created when said plurality of tone generators has been assigned to actuated keys and an additional key is actuated, wherein said phase state data further comprises selected numbers from phase state numbers 1 and 2 designating corresponding segments of said attack region, selected numbers from phase state numbers 3 and 4 designating corresponding segments of said decay region, and selected numbers from phase state numbers 5 and 6 designating corresponding segments of said release region, said combination further comprising;

phase state memory means comprising a multiplicity of phase storage means corresponding to said phase states 4, 5, and 6, phase storage circuitry responsive to said phase states 4, 5, and 6 wherein data read out from said third memory means are stored in corresponding members of said phase storage means, phase state priority circuitry comprising a multiplicity of priority logic circuitry wherein data corresponding to phase state 6 is selected if it exists, wherein data corresponding to phase state 5 is selected if it exists and data corresponding to phase state 6 does not exist, and wherein data corresponding to phase state 4 is selected it it exists and data corresponding to phase state 6 and phase state 5 do not exist, phase data reading means wherein data is read out from said phase storage means and caused to be selectively chosen by said phase state priority circuitry, phase state comparator means wherein said data selectively chosen by said phase state priority circuitry is compared with said phase state data read out of said third memory means and wherein an EQUAL signal is created if compared data are equal, phase initialization means wherein in response to said EQUAL signal and said DEMAND signal said phase storage means are reset to zero, and amplitude initialization means responsive to said EQUAL signal wherein said data stored in said second memory means is caused to correspond to amplitude variation data for end of phase state 6.

19. The combination according to claim 18 wherein said amplitude initialization means further comprises;

time rate circuitry means wherein in response to said EQUAL signal members of said multiplicity of frequency adjustable clocks are caused to increase in frequency thereby rapidly causing the corresponding phase state to complete the component steps of said phase state 6.

20. The combination according to claim 3 further comprising;

fourth memory means for storing said note release data to be thereafter read out, memory addressing circuitry whereby data stored in said second memory means, said third memory means, and said fourth memory means are read out repetitively in response to said master clocking means thereby sequencing through data corresponding to each member of said plurality of tone generators, note release decision circuitry responsive to said phase state numbers read out of said third memory means wherein if said phase state number is less than a preselected number then said note release signal is inhibited and caused to be stored in said fourth memory means, and note release comparator wherein nonzero data read out of said fourth memory means creates a note release signal is said phase state data read out of said third memory means if not less than said preselected number.

21. The combination according to claim 3 further comprising;

fourth memory means for storing said note release data to be thereafter read out, memory addressing circuitry whereby data stored in said second memory means, said third memory means, and said fourth memory means are read out repetitively in response to said master clocking means thereby sequencing data corresponding to each member of said plurality of tone generators, second comparator means wherein a comparison is made between said amplitude variation curve shape parameter H and said amplitude data read out of said second memory means and wherein a compare signal is generated if the difference between said compared data is less than some specified number, state circuitry responsive to said phase state number read out of said third memory means wherein if phase state number is equal to four and said compare signal is generated then a SUSTAIN signal is generated, and release logic circuitry wherein if said SUSTAIN signal is generated then said note release signal is not inhibited, wherein if SUSTAIN signal is generated and a nonzero value is read out from said fourth memory means then a new note release signal is created, and wherein if said parameter H is not zero then if note release signal is inhibited or said new note release signal is not created, a nonzero data value is stored in said fourth memory means.

22. In a musical instrument according to claim 3 wherein said phase state data further comprises selected numbers from phase state numbers 1 and 2 designating corresponding segments of said attack region, selected numbers from phase state numbers 3 and 4 designating corresponding segments of said decay region, and selected numbers from phase state numbers 5 and 6 designating corresponding segments of said release region; and wherein said first computation means further comprises;

binary evaluation means responsive to selected value H of said amplitude variation curve shape parameter and to said selected numbers from said phase state numbers wherein said new amplitude A' is generated.

23. In a musical instrument according to claim 22 wherein said amplitude variation curve shape parameters are selected from set of values $H=1$, $H=\frac{1}{2}$, $H=0$ by said scale selection means, the combination further comprises;

initial binary amplitude logic responsive to said selected value H and to said selected numbers from said phase state numbers wherein for phase state number 1 an initial amplitude $A_{01}$ is created with all bits "0" and a "1" in the bit position corresponding to the relation $$A_{01} = \tfrac{1}{2}\, 2^{-B}$$

where $B=2^{k-1}-1$ and $k$ is the number of computation steps comprising said attack region, wherein for phase state number 3 an initial amplitude $A_{03}$ is created with all bits "1" for $H=1$ and $H=\frac{1}{2}$; wherein for phase state number 5 an initial amplitude $A_{05}$ is created with "0" in the most significant bit and all other bits "1" for $H=\frac{1}{2}$, and wherein $A_{05}$ is created with all bits "1" for $H=1$; and wherein said initial amplitude values are caused to replace said amplitude values A read out from said second memory means.

24. In a musical instrument according to claim 23 wherein $A_M$ denotes most significant bit of binary representation of said amplitude A read out of said second memory means, $A_{M-1}$ denotes the second most significant bit of A, and $A_{M-2}$ denotes the third most significant bit of A, and wherein said phase state modification means further comprises;

incrementer circuitry responsive to said phase state number P and said selected value H, wherein P is caused to be incremented in accordance to the decision rules for $H=1$ $P=1$, $A_M=1$, $A_{M-1}=0$, then $P$ is incremented to $P=2$ $P=2$, all bits of $A$ are 1, then $P$ is incremented to $P=3$ $P=3$, NOTE RELEASE is generated, then $P$ is incremented to $P=5$ $P=5$, $A_M=1$, $A_{M-1}=0$, then $P$ is incremented to $P=6$ for $H=\frac{1}{2}$ $P=2$, $A_M=1$, $A_{M-1}=0$, then $P$ is incremented to $P=2$ $P=2$, all bits of $A$ are 1, then $P$ is incremented to $P=3$ $P=3$, $A_M=1$, $A_{M-1}=1$, $A_{M-2}=0$, then $P$ is incremented to $P=4$ $P=4$, NOTE RELEASE is generated, the $P$ is incremented to $P=5$ $P=5$, $A_{M-1}=1$, $A_{M-2}=0$, then $P$ is incremented to $P=6$ for $H=0$ $P=1$, $A_M=1$, $A_{M-1}=0$, then $P$ is incremented to $P=2$ $P=2$, all bits of $A$ are 1, then $P$ is incremented to $P=3$ $P=3$, $A_M=1$, $A_{M-1}=0$, the $P$ is incremented to $P=4$ $P=4$, all bits of $A$ are 0, then $P$ is incremented to $P=6$, and wherein said phase state number is caused to be incremented to $P=1$ in response to creation of said new note signal.

25. In a musical instrument according to claim 24 wherein said binary evaluation means further comprises;

binary data shifting means wherein said new amplitude A' is generated from said amplitude A in response to said phase state number P and said selected value H in accordance to the logic relations for $P=1$, left binary shift A by one bit position $P=2$, right binary shift A by one bit position, cause $A_M=1$ $P=3$, left binary shift of A by one bit position $P=4$, right binary shift of A by one bit position; if $H=\frac{1}{2}$ cause $A_M=1$ $P=5$, $H=0$, right binary shift of A by one bit position $P=5$, $H=1$, left binary shift of A by one bit position $P=5$, $H=\frac{1}{2}$, left binary shift of A by one bit position cause $A_M=0$ $P=6$, right binary shift of A by one bit position.

26. In an electronic musical instrument having keying means operable between actuated and released conditions, the combination comprising;

memory means for storing amplitude and phase state data to be thereafter read out, memory addressing means for causing data stored in said memory means to be read out, computation means responsive to data read out of said memory means wherein a new amplitude is generated, decision means wherein a selection is made between said new amplitude and a computed initial phase amplitude, timing means comprising a timing clock wherein in response to said timing clock a selection is made between selection by said decision means and amplitude data read out from said memory means, and second memory addressing means wherein amplitude data selected by said timing means is caused to be stored in said memory means, wherein if said computed initial amplitude is selected said phase sate data is incremented and caused to be stored in said memory means.

27. In an electronic musical instrument according to claim 4 wherein said scale memory means further comprises;

first memory means for storing division data to be thereafter read out, second memory decoding means responsive to said logic timing signals whereby data read out of said first memory means corresponds to data read out of said second memory means, and selection control means wherein selected values of said amplitude variation curve shape parameters are caused to be read out of said scale memory means in response to instrument division data read out from said first memory means.

28. In a musical instrument according to claim 10 wherein said master clocking means further comprises;

a first memory means for storing instrument division data to be thereafter read out, and a multiplicity of frequency adjustable clocks wherein each member of said multiplicity can be associated with each said phase state read out from said third memory means and with said instrument division data read out of said first memory means.

29. In a musical instrument according to claim 28 wherein said second decision means further comprises;

timing signal memory means comprising a multiplicity of signal storage means associated with corresponding members of said multiplicity of frequency adjustable timing clocks wherein signals created by said frequency timing clocks are stored to be thereafter read out, phase selection means wherein in response to said phase state data read out from said third memory means selection is made from contents read out of said signal storage means, division selection means wherein in response to said instrument division data read out from said first memory means a selection is made from contents read out of said signal storage means selected by said phase selection means, second amplitude selection means wherein in response to a nonzero value in said signal storage means selected by said division selection means said new amplitude A′ from said envelope initializer means is selected and wherein in response to a zero value in said signal storage means selected by said division selection means said data read out from said second memory means is selected, and storage means wherein data selected by said second amplitude selection means is caused to be stored in said second memory means.

30. In a musical instrument according to claim 29 wherein said second amplitude selection means further comprises;

circuitry wherein in response to a nonzero value in said signal storage means selected by said division selection means said new amplitude A′ is selected and wherein in response to a zero value in said storage means selected by said division selection means said data read out from said second memory means is selected.

* * * * *